US012592806B2

(12) United States Patent
Abotabl et al.

(10) Patent No.: US 12,592,806 B2
(45) Date of Patent: Mar. 31, 2026

(54) MEASUREMENT AND REPORTING OF CROSS-LINK INTERFERENCE IMPACT ON DOWNLINK PERFORMANCE FOR FULL-DUPLEX NETWORKS

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Abdelrahman Mohamed Ahmed Mohamed Ibrahim, San Diego, CA (US); Marwen Zorgui, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 322 days.

(21) Appl. No.: 18/331,591

(22) Filed: Jun. 8, 2023

(65) Prior Publication Data

US 2024/0413953 A1 Dec. 12, 2024

(51) Int. Cl.
| | |
|---|---|
| *H04L 5/00* | (2006.01) |
| *H04B 17/345* | (2015.01) |
| *H04W 72/0446* | (2023.01) |
| *H04W 72/23* | (2023.01) |
| *H04W 72/541* | (2023.01) |

(52) U.S. Cl.
CPC ......... *H04L 5/0057* (2013.01); *H04B 17/345* (2015.01); *H04L 5/0055* (2013.01); *H04L 5/006* (2013.01); *H04W 72/0446* (2013.01); *H04W 72/23* (2023.01); *H04W 72/541* (2023.01)

(58) Field of Classification Search
CPC ..... H04L 5/0057; H04L 5/0055; H04L 5/006; H04L 5/14; H04B 17/345; H04W 72/0446; H04W 72/23; H04W 72/541; H04W 24/02
USPC ........................................................ 370/252
See application file for complete search history.

(56) References Cited

U.S. PATENT DOCUMENTS

| | | | | |
|---|---|---|---|---|
| 2024/0214852 A1* | 6/2024 | Kiran | .................... | H04W 24/10 |
| 2024/0267932 A1* | 8/2024 | Rudolf | ................ | H04W 72/232 |
| 2024/0283552 A1* | 8/2024 | Mahama | ............... | H04W 24/08 |

* cited by examiner

*Primary Examiner* — Mang Hang Yeung
(74) *Attorney, Agent, or Firm* — Procopio, Cory, Hargreaves & Savitch LLP/Qualcomm Incorporated

(57) ABSTRACT

In an aspect, a UE may obtain receive an indication to report a measurement of CLI in an SBFD slot or symbol. The UE may also perform, based on the indication, a measurement of (1) a received interference power in a first sub-band configured for uplink transmission of the SBFD slot or symbol during a PDSCH or PDCCH reception in a second sub-band configured for downlink reception of the SBFD slot or symbol and/or (2) an LLR quality, for a plurality of resource blocks, based on a gap corresponding to a boundary between the first sub-band configured for the uplink transmission of the SBFD slot or symbol and the second sub-band configured for the downlink reception of the SBFD slot or symbol. The UE may also transmit an indication of the measurement of (1) the received interference power and/or (2) the LLR quality.

30 Claims, 18 Drawing Sheets

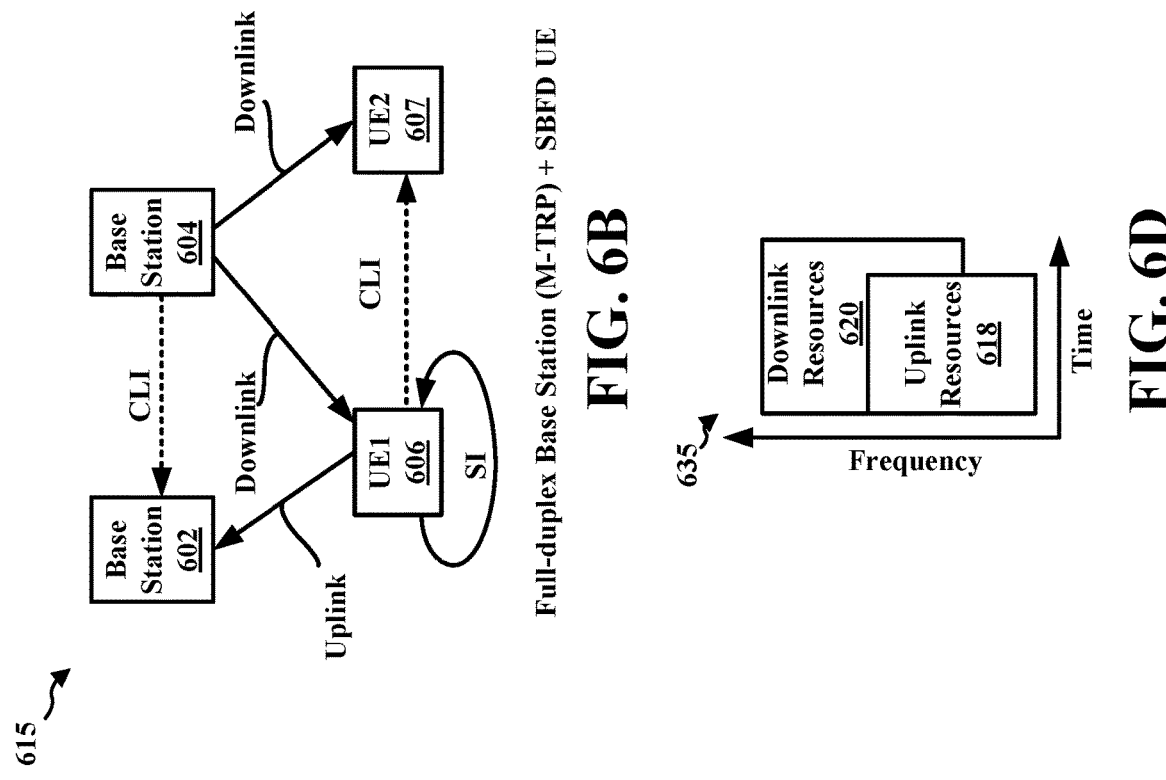
Full-duplex Base Station (M-TRP) + SBFD UE
FIG. 6B
FIG. 6D
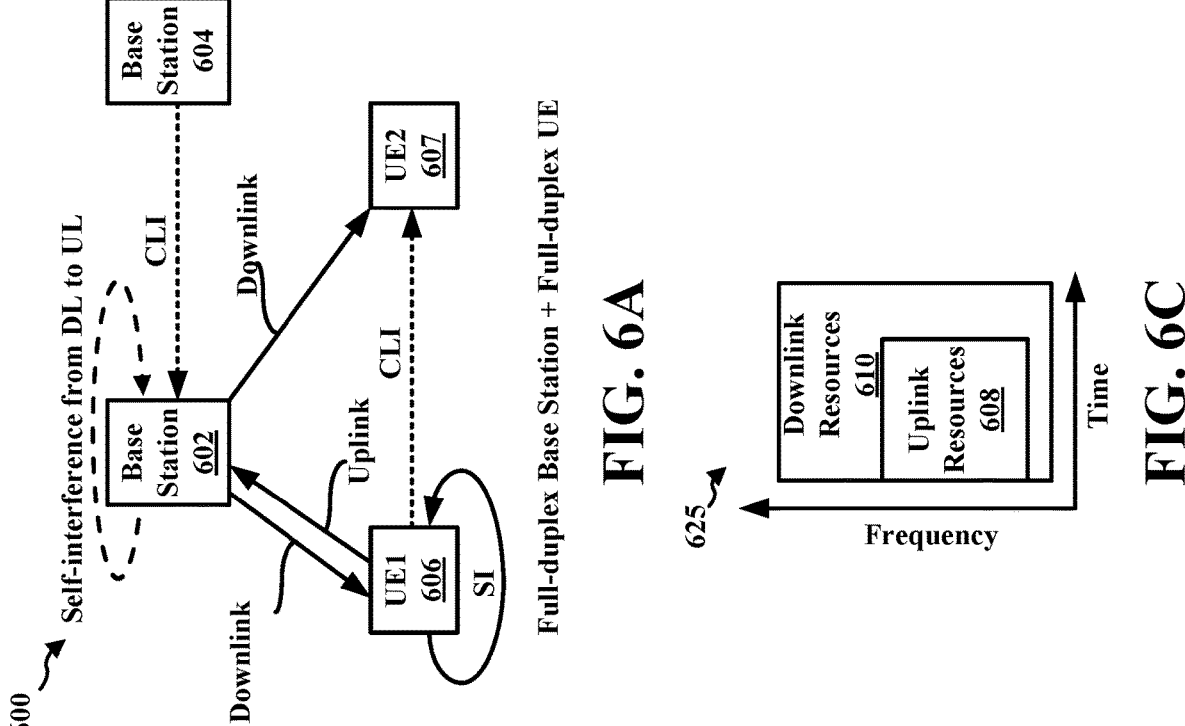
Full-duplex Base Station + Full-duplex UE
FIG. 6A
FIG. 6C

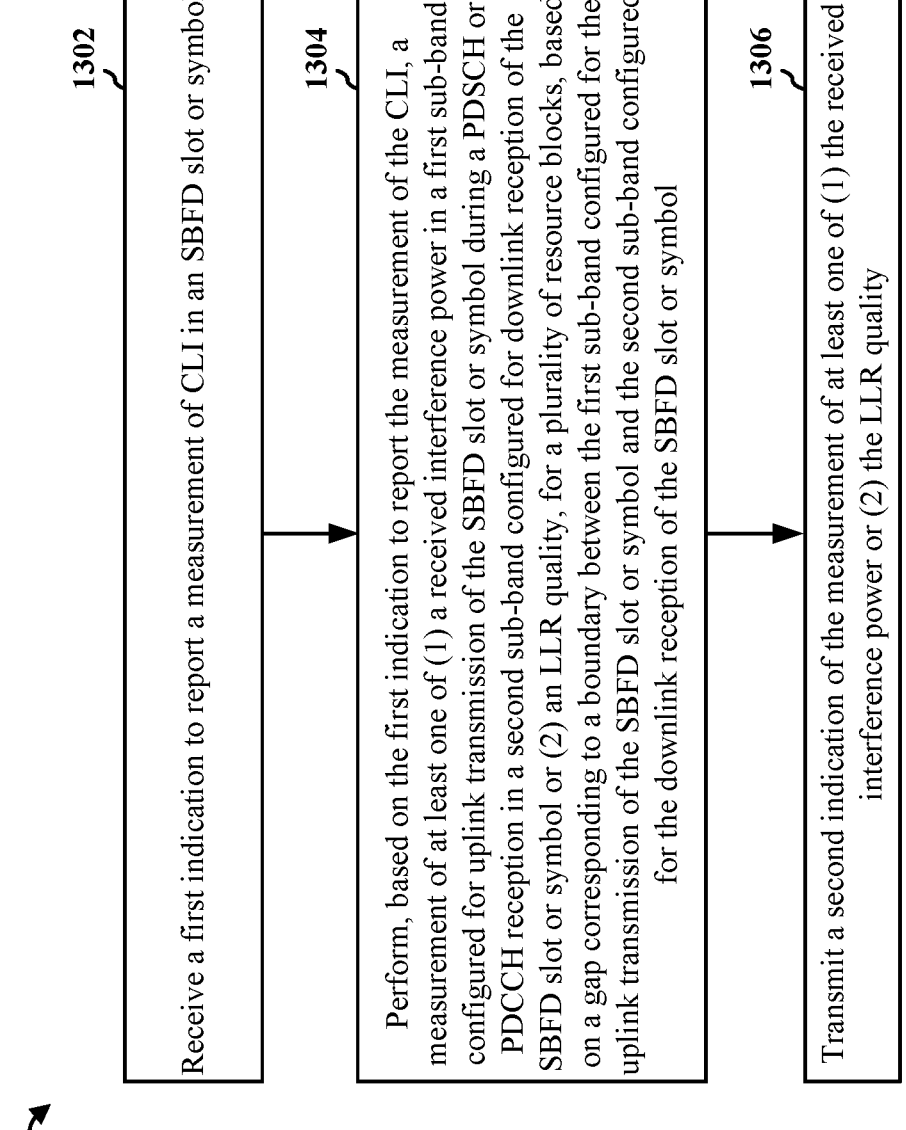

1302

Receive a first indication to report a measurement of CLI in an SBFD slot or symbol

1304

Perform, based on the first indication to report the measurement of the CLI, a measurement of at least one of (1) a received interference power in a first sub-band configured for uplink transmission of the SBFD slot or symbol during a PDSCH or PDCCH reception in a second sub-band configured for downlink reception of the SBFD slot or symbol or (2) an LLR quality, for a plurality of resource blocks, based on a gap corresponding to a boundary between the first sub-band configured for the uplink transmission of the SBFD slot or symbol and the second sub-band configured for the downlink reception of the SBFD slot or symbol

1306

Transmit a second indication of the measurement of at least one of (1) the received interference power or (2) the LLR quality

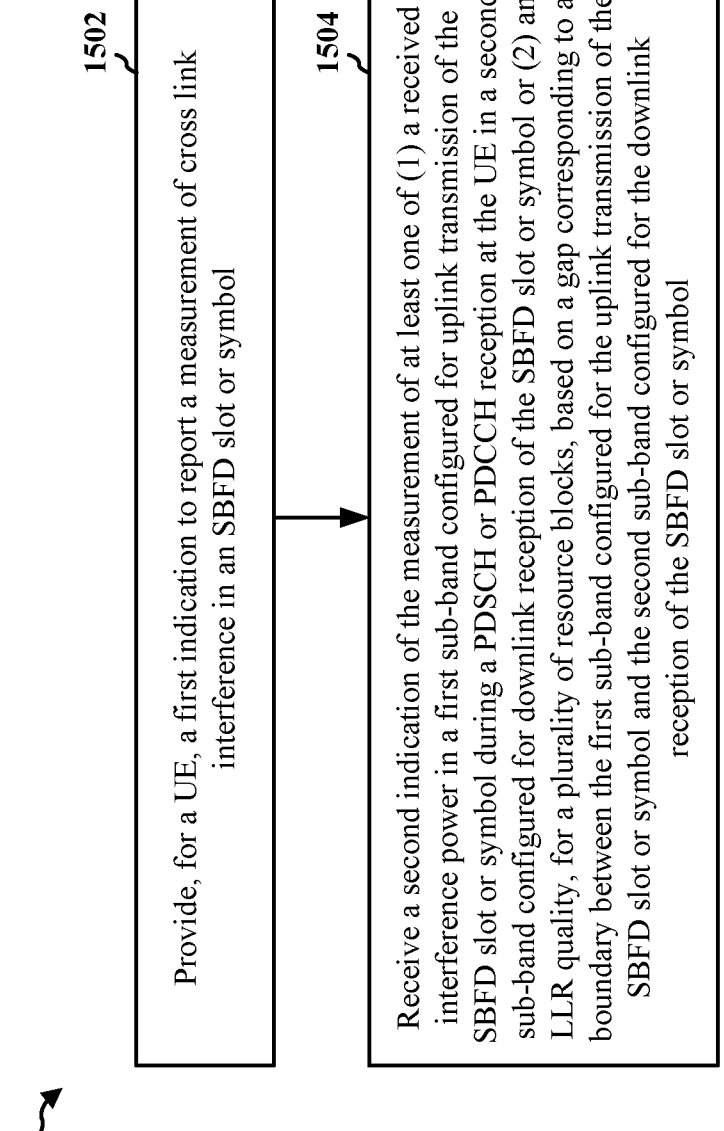

1500

1502

Provide, for a UE, a first indication to report a measurement of cross link interference in an SBFD slot or symbol

1504

Receive a second indication of the measurement of at least one of (1) a received interference power in a first sub-band configured for uplink transmission of the SBFD slot or symbol during a PDSCH or PDCCH reception at the UE in a second sub-band configured for downlink reception of the SBFD slot or symbol or (2) an LLR quality, for a plurality of resource blocks, based on a gap corresponding to a boundary between the first sub-band configured for the uplink transmission of the SBFD slot or symbol and the second sub-band configured for the downlink reception of the SBFD slot or symbol

FIG. 15

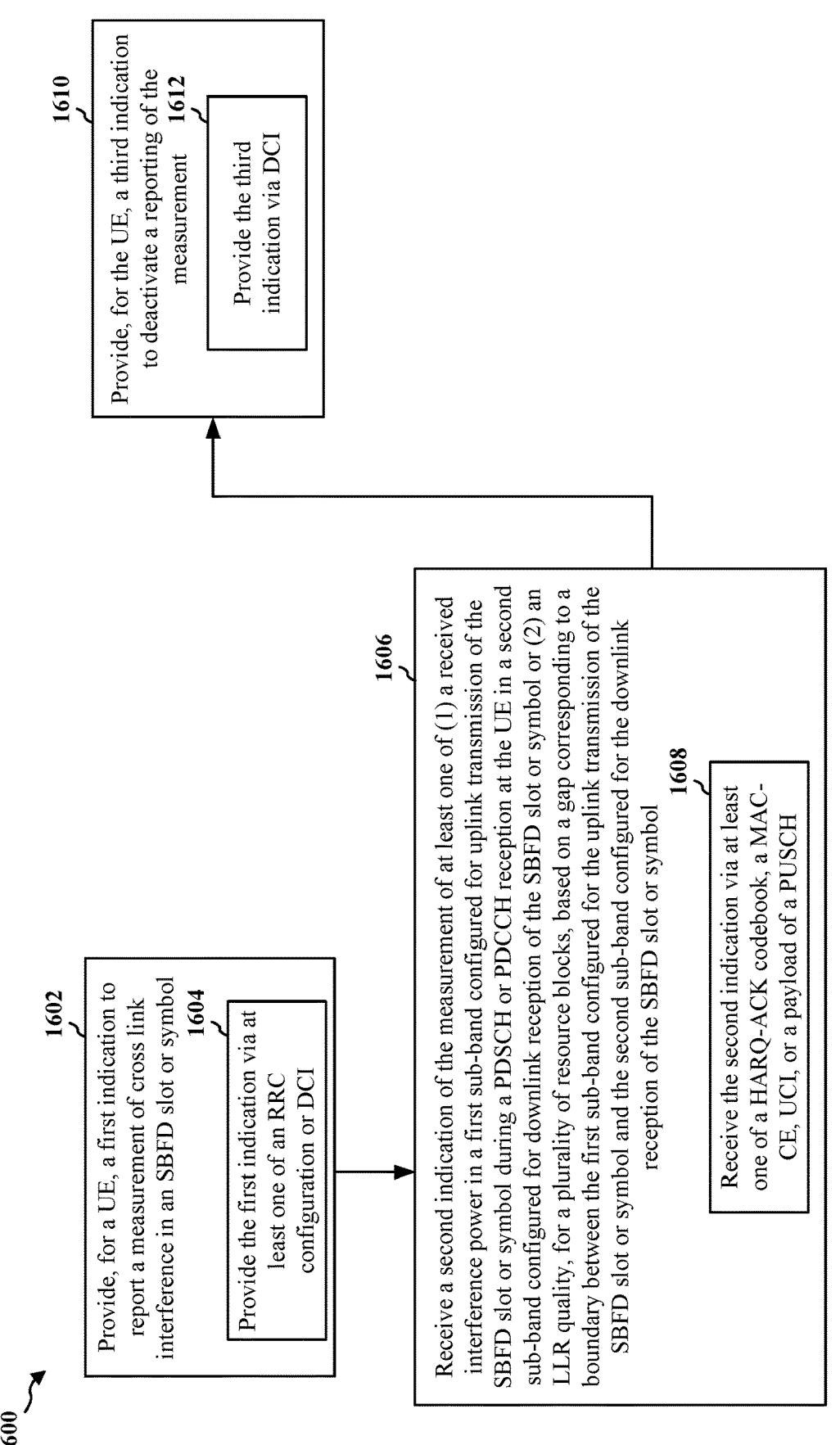

1600

1602

Provide, for a UE, a first indication to report a measurement of cross link interference in an SBFD slot or symbol

1604

Provide the first indication via at least one of an RRC configuration or DCI

1606

Receive a second indication of the measurement of at least one of (1) a received interference power in a first sub-band configured for uplink transmission of the SBFD slot or symbol during a PDSCH or PDCCH reception at the UE in a second sub-band configured for downlink reception of the SBFD slot or symbol or (2) an LLR quality, for a plurality of resource blocks, based on a gap corresponding to a boundary between the first sub-band configured for the uplink transmission of the SBFD slot or symbol and the second sub-band configured for the downlink reception of the SBFD slot or symbol

1608

Receive the second indication via at least one of a HARQ-ACK codebook, a MAC-CE, UCI, or a payload of a PUSCH

1610

Provide, for the UE, a third indication to deactivate a reporting of the measurement    1612

Provide the third indication via DCI

FIG. 16

MEASUREMENT AND REPORTING OF CROSS-LINK INTERFERENCE IMPACT ON DOWNLINK PERFORMANCE FOR FULL-DUPLEX NETWORKS

TECHNICAL FIELD

The present disclosure relates generally to communication systems, and more particularly, to cross-link interference in full-duplex networks.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus at a user equipment (UE) are provided. The apparatus may include memory and at least one processor coupled to the memory. The at least one processor, individually or in any combination, based at least in part on information stored in the memory may be configured to receiving a first indication to report a measurement of cross-link interference in a sub-band full-duplex (SBFD) slot or symbol, to perform, based on the first indication to report the measurement of the cross-link interference, a measurement of at least one of (1) a received interference power in a first sub-band configured for uplink transmission of the SBFD slot or symbol during a physical downlink shared channel (PDSCH) or physical downlink control channel (PDCCH) reception in a second sub-band configured for downlink reception of the SBFD slot or symbol or (2) a log likelihood ratio (LLR) quality, for a plurality of resource blocks, based on a gap corresponding to a boundary between the first sub-band configured for the uplink transmission of the SBFD slot or symbol and the second sub-band configured for the downlink reception of the SBFD slot or symbol, and to transmit a second indication of the measurement of at least one of (1) the received interference power or (2) the LLR quality.

In another aspect of the disclosure, a method, a computer-readable medium, and an apparatus at a user equipment (UE) are provided. The apparatus may include memory and at least one processor coupled to the memory. The at least one processor, individually or in any combination, based at least in part on information stored in the memory may be configured to provide, for a UE, a first indication to report a measurement of cross-link interference in an SBFD slot or symbol, and to receive a second indication of the measurement of at least one of (1) a received interference power in a first sub-band configured for uplink transmission of the SBFD slot or symbol during a PDSCH or PDCCH reception at the UE in a second sub-band configured for downlink reception of the SBFD slot or symbol or (2) an LLR quality, for a plurality of resource blocks, based on a gap corresponding to a boundary between the first sub-band configured for the uplink transmission of the SBFD slot or symbol and the second sub-band configured for the downlink reception of the SBFD slot or symbol.

BRIEF DESCRIPTION OF THE DRAWINGS

FIG. 6A shows an example of full-duplex communication in which a base station is in full-duplex communication with a first UE and a second UE.

FIG. 6B shows an example of full-duplex communication in which a base station configured with multiple transmission reception points is in full-duplex communication with a first UE and the second UE.

FIG. 6C illustrates a diagram of a first configuration of fully overlapping uplink/downlink resources.

FIG. 6D illustrates a diagram of a second configuration of partially overlapping uplink/downlink resources.

FIG. 13 is a flowchart illustrating methods of wireless communication in accordance with various aspects of the present disclosure.

FIG. 15 is a flowchart illustrating methods of wireless communication in accordance with various aspects of the present disclosure.

FIG. 16 is a flowchart illustrating methods of wireless communication in accordance with various aspects of the present disclosure.

DETAILED DESCRIPTION

Figure 1:
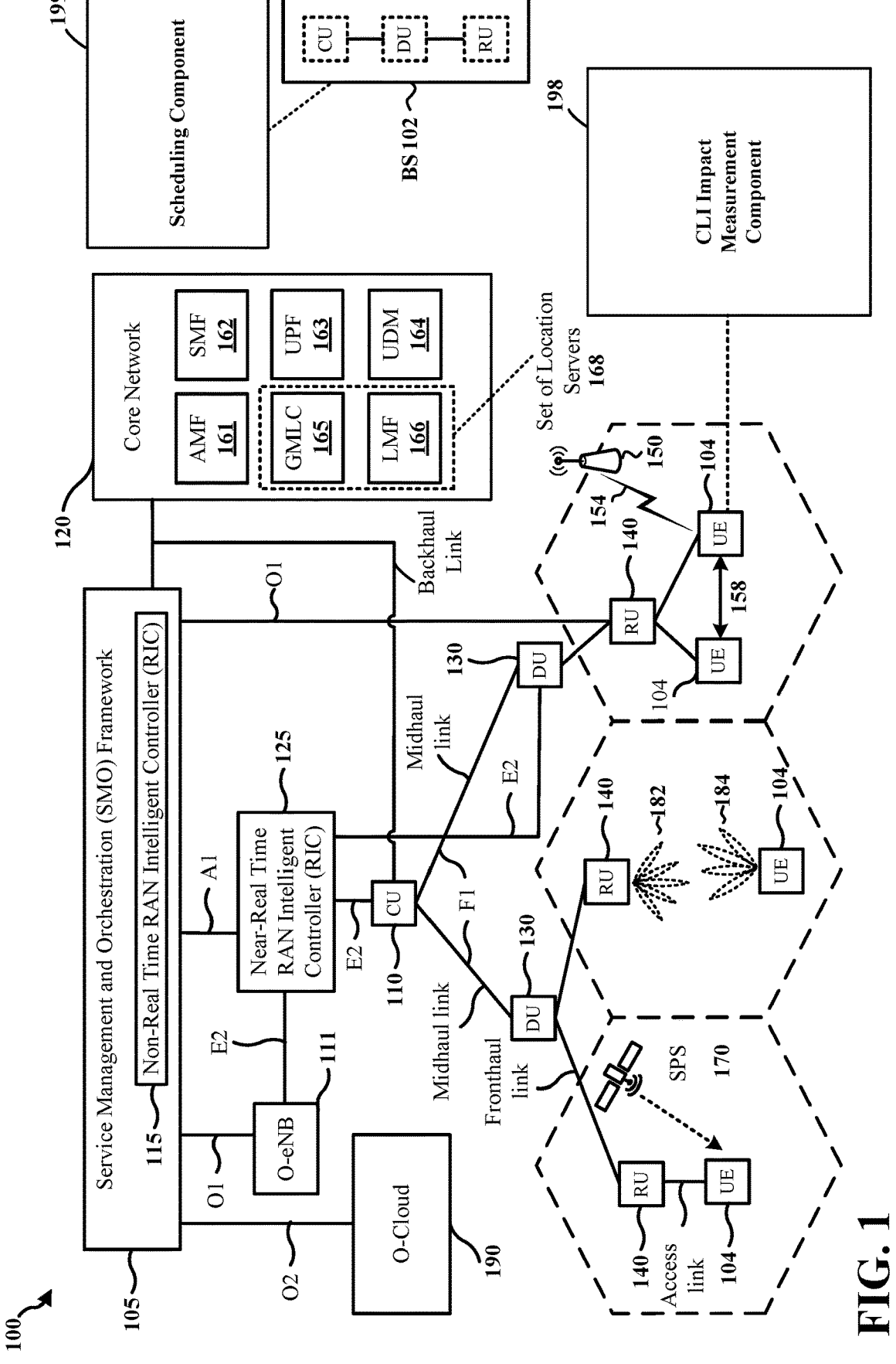
FIG. 1 is a diagram illustrating an example of a wireless communications system and an access network.

Various aspects of the present disclosure, in connection with the accompanying drawings, relate generally to communication systems. Some aspects more specifically relate to determining and reporting the cross-link interference (CLI) impact on downlink performance (e.g., the decodability of a downlink transmission) in full-duplex (FD) networks. For instance, a UE may determine the CLI impact by (1) measuring the received interference power in an uplink sub-band during the reception of a downlink communication in a downlink sub-band and/or (2) measuring the log-likelihood ratio (LLR) quality, for a plurality of resource blocks, based on a gap corresponding to a boundary between the uplink sub-band and a downlink sub-band. The UE may report the CLI impact to a network node. The network node may update its scheduler to schedule transmissions to lessen the CLI impact on the decoder of the UE.

Particular aspects of the subject matter described in this disclosure can be implemented to realize one or more of the following potential advantages. In some examples, by reporting the CLI impact to the network node, the network node may schedule uplink transmissions of different UEs in different resources without reducing the modulation coding scheme. As such, the number of useful bits that can be transmitted per resource element are not reduced, thereby improving the integrity of the data being transmitted, while also reducing the cross-link interference experienced at the UE.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUS), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/ purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration.

The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHZ-7.125 GHZ) and FR2 (24.25 GHz-52.6 GHZ). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHZ. For example, three higher operating bands have been identified as frequency range designations FR2-2 (52.6 GHZ-71 GHZ), FR4 (71 GHz-114.25 GHZ), and FR5 (114.25 GHZ-300 GHz). Each of these higher frequency bands falls within the EHF band.

With the above aspects in mind, unless specifically stated otherwise, the term "sub-6 GHz" or the like if used herein may broadly represent frequencies that may be less than 6 GHZ, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/ actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a sub-scriber unit, a wireless unit, a remote unit, a mobile device, a wireless device, a wireless communications device, a remote device, a mobile subscriber station, an access termi-nal, a mobile terminal, a wireless terminal, a remote termi-nal, a handset, a user agent, a mobile client, a client, or some other suitable terminology. In some scenarios, the term UE may also apply to one or more companion devices such as in a device constellation arrangement. One or more of these devices may collectively access the network and/or indi-vidually access the network.

Referring again to FIG. 1, in certain aspects, the UE 104 may have a CLI impact measurement component 198 that may be configured to receive a first indication to report a measurement of CLI in an SBFD slot or symbol, to perform, based on the first indication to report the measurement of the CLI, a measurement of at least one of (1) a received interference power in a first sub-band configured for uplink transmission of the SBFD slot or symbol during a PDSCH or PDCCH reception in a second sub-band configured for downlink reception of the SBFD slot or symbol or (2) an LLR quality, for a plurality of resource blocks, based on a gap corresponding to a boundary between the first sub-band configured for the uplink transmission of the SBFD slot or symbol and the second sub-band configured for the down-link reception of the SBFD slot or symbol, and to transmit a second indication of the measurement of at least one of (1) the received interference power or (2) the LLR quality. In certain aspects, the base station 102 may have a scheduling component 199 that may be configured to provide, for a UE, a first indication to report a measurement of cross-link interference in an SBFD slot or symbol, and to receive a second indication of the measurement of at least one of (1) a received interference power in a first sub-band configured for uplink transmission of the SBFD slot or symbol during a PDSCH or PDCCH reception at the UE in a second sub-band configured for downlink reception of the SBFD slot or symbol or (2) an LLR quality, for a plurality of resource blocks, based on a gap corresponding to a boundary between the first sub-band configured for the uplink trans-mission of the SBFD slot or symbol and the second sub-band configured for the downlink reception of the SBFD slot or symbol.

Figures 2A, 2B, 2C, 2D:
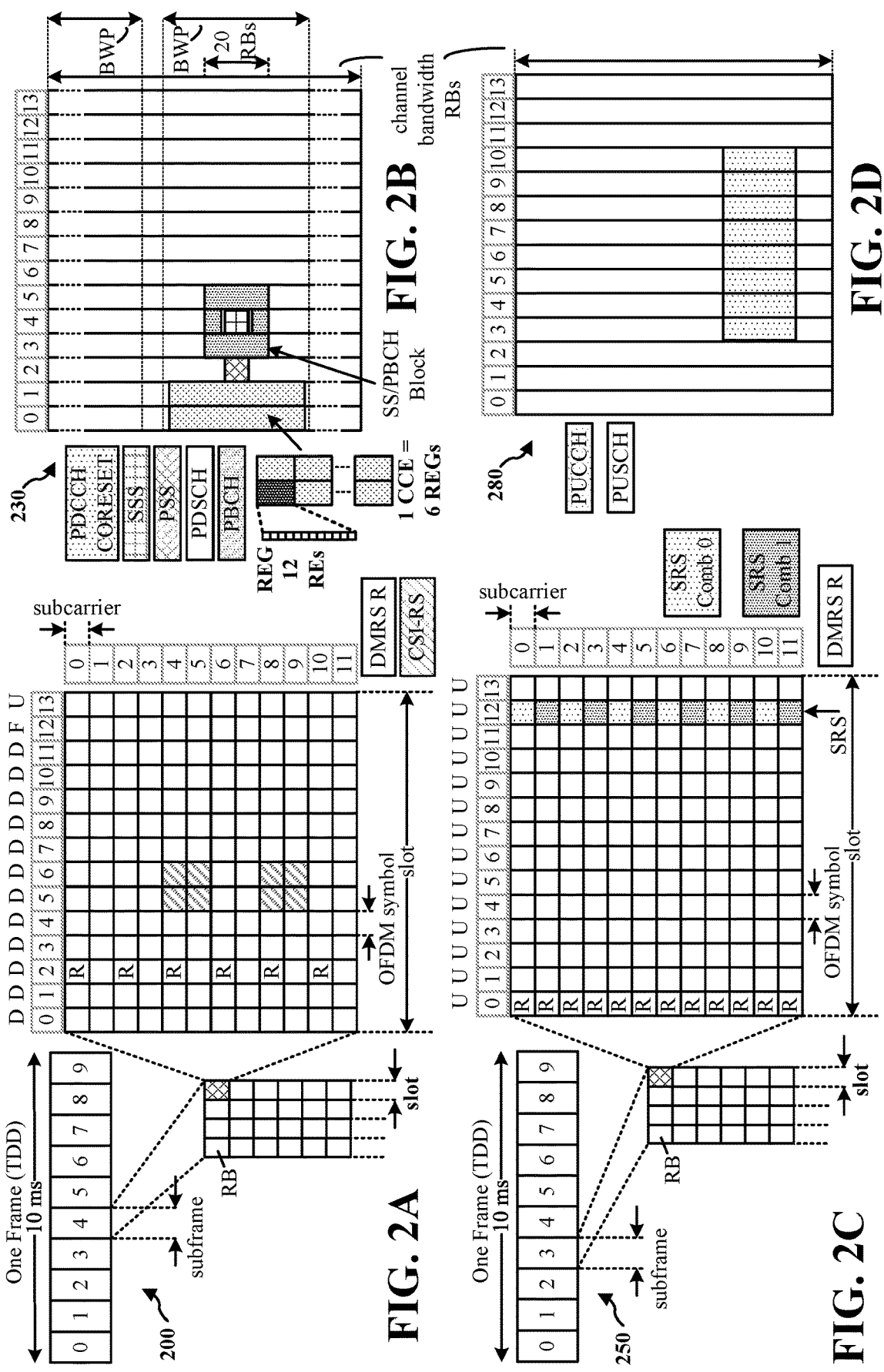
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the descrip-tion infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depend-ing on whether the cyclic prefix (CP) is normal or extended. For normal CP, each slot may include 14 symbols, and for extended CP, each slot may include 12 symbols. The sym-bols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited sce-narios; limited to a single stream transmission). The number of slots within a subframe is based on the CP and the numerology. The numerology defines the subcarrier spacing (SCS) (see Table 1). The symbol length/duration may scale with 1/SCS.

TABLE 1

| Numerology, SCS, and CP | | |
|---|---|---|
| μ | SCS $\Delta f = 2^{\mu} \cdot 15$ [kHz] | Cyclic prefix |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numer-ology μ, there are 14 symbols/slot and $2^{\mu}$ slots/subframe. The subcarrier spacing may be equal to $2^{\mu}*15$ kHz, where u is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multi-plexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
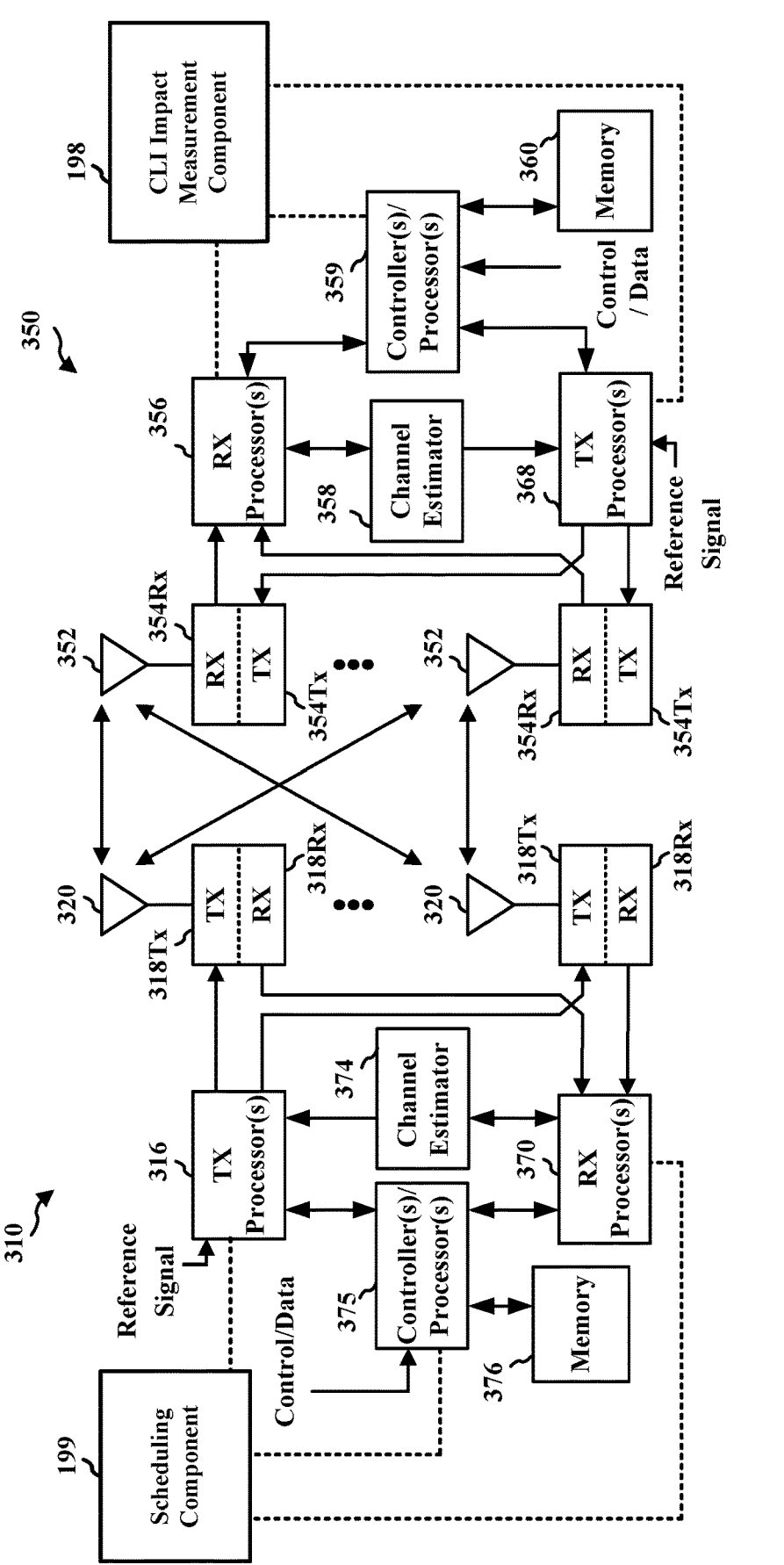
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller(s)/processor(s) 375. The controller(s)/processor(s) 375 may include at least one controller/processor and may implement layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller(s)/processor(s) 375 provide RRC layer functionality associated with broadcasting of system information (e.g., MIB, SIBs), RRC connection control (e.g., RRC connection paging. RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor(s) 316 and the receive (RX) processor(s) 370 may respectively include at least one TX processor and RX processor and may implement layer 1 functionality associated with various signal processing functions. Layer 1, which includes a physical (PHY) layer, may include error detection on the transport channels, forward error correction (FEC) coding/decoding of the transport channels, interleaving, rate mapping matching, onto physical channels, modulation/demodulation of physical channels, and MIMO antenna processing. The TX processor(s) 316 handle mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor(s) 356. The TX processor(s) 368 and the RX processor(s) 356 may respectively include at least one TX processor and RX processor and may implement layer 1 functionality associated with various signal processing functions. The RX processor(s) 356 may perform spatial processing on the information to recover any spatial streams destined for the UE 350. If multiple spatial streams are destined for the UE 350, they may be combined by the RX processor(s) 356 into a single OFDM symbol stream. The RX processor(s) 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller(s)/processor(s) 359, which implements layer 3 and layer 2 functionality.

The controller(s)/processor(s) 359 can be associated with at least one memory 360 that stores program codes and data. The controller(s)/processor(s) 359 may be at least one controller/processor. The at least one memory 360 may be referred to as a computer-readable medium. In the UL, the controller(s)/processor(s) 359 provide demultiplexing between transport and logical channels, packet reassembly, deciphering, header decompression, and control signal processing to recover IP packets. The controller(s)/processor(s) 359 are also responsible for error detection using an ACK and/or NACK protocol to support HARQ operations.

Similar to the functionality described in connection with the DL transmission by the base station 310, the controller(s)/processor(s) 359 provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor(s) 368 to select the appropriate coding and modulation schemes, and to facilitate spatial processing. The spatial streams generated by the TX processor(s) 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to RX processor(s) 370.

The controller(s)/processor(s) 375 can be associated with at least one memory 376 that stores program codes and data. The at least one memory 376 may be referred to as a computer-readable medium. In the UL, the controller(s)/processor(s) 375 provide demultiplexing between transport and logical channels, packet reassembly, deciphering, header decompression, control signal processing to recover IP packets. The controller(s)/processor(s) 375 are also responsible for error detection using an ACK and/or NACK protocol to support HARQ operations.

At least one of the TX processor(s) 368, the RX processor(s) 356, and the controller/processor(s) 359, individually or in any combination, may be configured to perform aspects in connection with the CLI impact measurement component 198 of FIG. 1.

At least one of the TX processor(s) 316, the RX processor(s) 370, and the controller/processor(s) 375, individually or in any combination, may be configured to perform aspects in connection with the scheduling component 199 of FIG. 1.

Figure 4C:
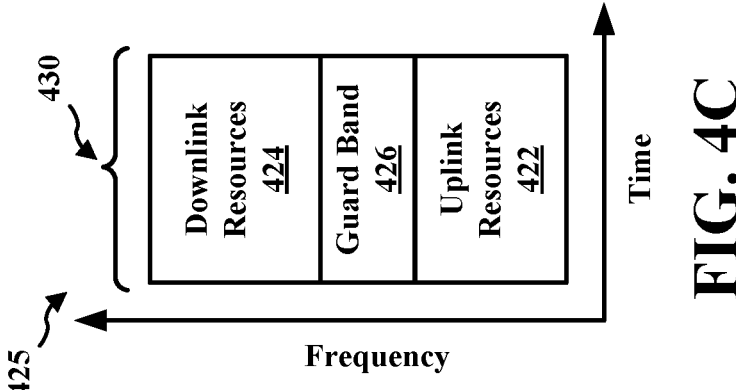
FIG. 4C depicts an example diagram in which a full-duplex capable UE may employ SBFD communication.
Figure 4B:
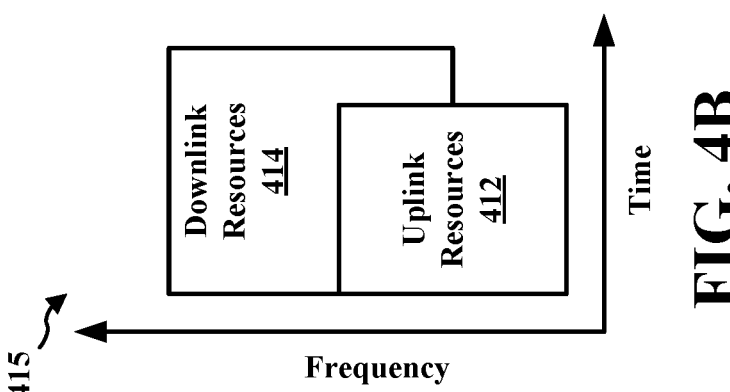
FIG. 4B depicts a diagram illustrating a partial overlap of a same in-band full-duplex communication.
Figure 4A:
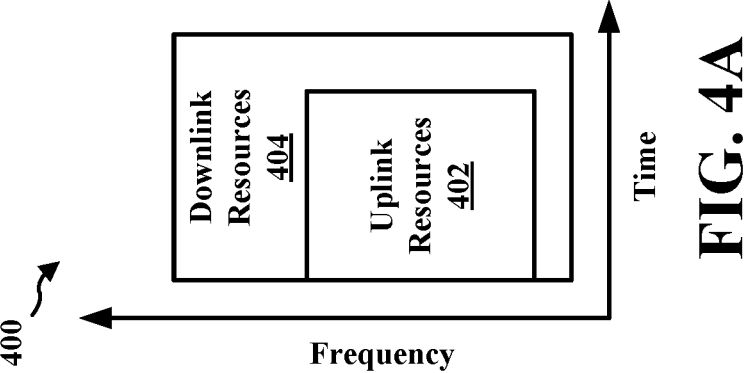
FIG. 4A depicts a diagram illustrating a full overlap of a same in-band full-duplex communication.

A UE may implement FD communication via in-band full-duplex (IBFD) or sub-band full-duplex (SBFD) (also known as sub-band frequency division duplex (FDD)). When employing IBFD, the UE transmits and receives on the same time and frequency resource. That is, a downlink transmission and an uplink transmission may share the same IBFD time/frequency resource. FIGS. 4A and 4B depict example diagrams in which an FD-capable UE may employ IBFD communication. FIG. 4A depicts a diagram 400 illustrating a full overlap of a same IBFD resource. For example, uplink resources 402 (e.g., resources used by the UE for transmitting an uplink transmission) may fully overlap with downlink resources 404 (e.g., resources used by the UE for receiving a downlink transmission). FIG. 4B depicts a diagram 415 illustrating a partial overlap of a same IBFD resource. For example, uplink resources 412 may partially overlap with downlink resources 414.

When employing SBFD communication, the UE may transmit and receive at the same time but using different frequency resources. FIG. 4C depicts an example diagram 425 in which a full-duplex capable UE may employ SBFD communication (also referred to as "flexible duplex"). In some examples, uplink resources 422 and downlink resources 424 may be configured within a same time division duplex (TDD) band. As shown in FIG. 4C, the uplink resources 422 and the downlink resources 424 may overlap in time, but do not overlap with respect to frequency resources. For example, the uplink resources 422 may be separated from the downlink resources 424 in the frequency domain, for instance, by a guard band 426. Moreover, both of the uplink resources 422 and the downlink resources 424 of the SBFD example of FIG. 4C may be within a same TDD band 430. In contrast, the uplink resources 402, 412 and/or the downlink resources 404, 414 of the IBFD examples of FIGS. 4A and 4B, respectively, may be configured across TDD bands.

Figure 5B:
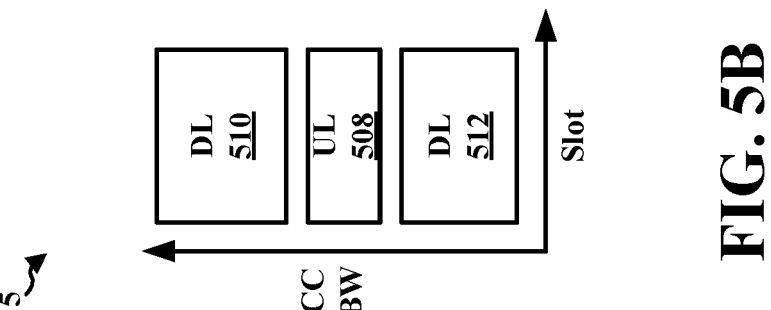
FIG. 5B illustrates a diagram in which a base station that is capable of SBFD communication.
Figure 5A:
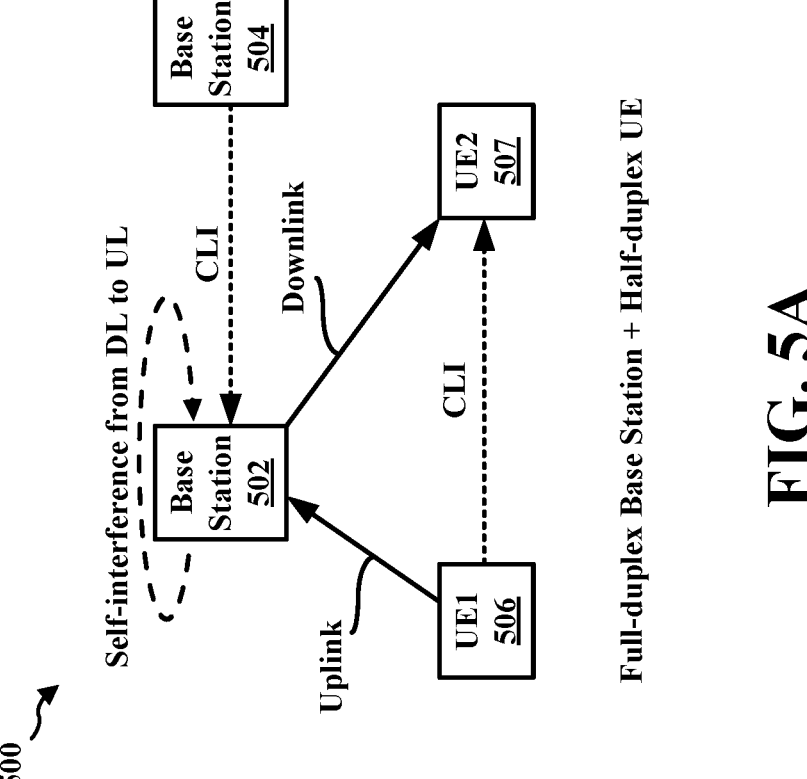
FIG. 5A depicts a diagram including a base station that is capable of full-duplex communication.

FIG. 5A shows an example of full-duplex communication 500 in which a first base station 502 is in FD communication with a first UE 506 and a second UE 507. The first UE 506 and the second UE 507 may be configured for half-duplex (HD) communication. FIG. 5A illustrates the first UE 506 performing an uplink transmission, and the second UE 507 performing a downlink reception. The first base station 502 may transmit a downlink signal to the second UE 507 concurrently (e.g., overlapping at least partially in time) with receiving the uplink signal from the first UE 506. The first base station 502 may experience self-interference at its receiving antenna that is receiving the uplink signal from the first UE 506, the self-interference being due to reception of at least part of the downlink signal transmitted to the second UE 507. The first base station 502 may experience additional interference due to signals from a second base station 504. The additional interference may be cross-link interference, where the first base station 502 and the second base station 504 interfere with each other as they transmit and receive in the same frequency band. The second UE 507 may experience cross-link interference due to signals from the first UE 506.

The first base station 502 may utilize non-overlapping uplink/downlink sub-bands (i.e., sub-band full-duplex) when transmitting and receiving signals to and from the first UE 506 and the second UE 507. For instance, FIG. 5B illustrates a diagram 515 in which the first base station 502 may utilize non-overlapping uplink/downlink sub-bands (i.e., sub-band full-duplex) when transmitting and receiving signals to and from the first UE 506 and the second UE 507. For instance, the first base station 502 may receive the uplink signal in the uplink resources 508 and transmit the downlink signal to the second UE 507 in the downlink resources 510 or/the downlink resources 512.

FIG. 6A shows an example of full-duplex communication 600 in which a first base station 602 is in FD communication with a first UE 606 and a second UE 607. The first UE 606 and the second UE 607 may be configured for FD communication. FIG. 6A illustrates the first UE 606 transmitting an uplink signal to the first base station 602 concurrently (e.g., overlapping at least partially in time) with receiving a downlink signal from the first base station 602. The first base station 602 may also transmit a downlink signal to the second UE 607 concurrently with transmitting the downlink signal to the first UE 606 and/or receiving the uplink signal from the first UE 606. The first base station 602 may experience self-interference at its receiving antenna that is receiving the uplink signal from the first UE 606, the self-interference being due to reception of at least part of the downlink signal transmitted to the second UE 607. The first base station 602 may experience cross-link interference due to signals from a second base station 604. The first UE 606 may experience self-interference, for example, due to signals received by a first antenna panel of the first UE 606 propagating and interfering with signal transmitted by a second antenna panel of the first UE 606. The second UE 607 may experience cross-link interference due to signals from the first UE 606.

FIG. 6B shows an example of full-duplex communication 615 in which a first base station 602 configured with multiple transmission reception points (m-TRP) is in FD communication with a first UE 606 and the second UE 607. The first UE 606 and the second UE 607 may be configured for SBFD communication. FIG. 6A illustrates the first UE 606 transmitting an uplink signal to the first base station 602 concurrently (e.g., overlapping at least partially in time) with receiving a downlink signal from the second base station 604. The second base station 604 may also transmit a downlink signal to the second UE 607 concurrently with transmitting the downlink signal to the first UE 606. The first base station 602 may experience cross-link interference due to signals from a second base station 604. The first UE 606 may experience self-interference, for example, due to signals received by a first antenna panel of the first UE 606 propagating and interfering with signal transmitted by a second antenna panel of the first UE 606. The second UE 607 may experience cross-link interference due to signals from the first UE 606.

As shown in FIGS. 6C and 6D, the first base station 602 may utilize partially or fully overlapping uplink/downlink resources when transmitting and receiving signals to and from the first UE 606 and the second UE 607. For instance, FIG. 6C illustrates a diagram 625 in which the first base station 602 may utilize a first configuration of fully overlapping uplink/downlink resources when transmitting and receiving signals to and from the first UE 606 and the second UE 607. For instance, the first base station 602 may receive the uplink signal from the first UE 606 in the uplink resources 608 and transmit the downlink signal to the first UE 606 and/or the second UE 607 in the downlink resources 610. FIG. 6D illustrates a diagram 635 in which the first base station 602 may utilize a second configuration of partially overlapping uplink/downlink resources when transmitting and receiving signals to and from the first UE 606 and the second UE 607. For instance, the first base station 602 may receive the uplink signal from the first UE 606 in the uplink resources 618 and transmit the downlink signal to the first UE 606 and/or the second UE 607 in the downlink resources 620.

An SBFD slot format may be referred to as a downlink plus uplink (D+U) slot. A D+U slot may be a slot in which the band is used for but uplink and downlink transmissions. The downlink and uplink transmission may occur in overlapping bands (in-band full-duplex) or adjacent bands (sub-band full-duplex). In a given D+U symbol, an HD UE may either transmit in the uplink band or receive in the downlink band. In a given D+U symbol, an FD UE may transmit in the uplink band and/or receive in the downlink band in the same slot. A D+U slot may contain just downlink symbols, just uplink symbols, or FD symbols.

Figure 7:
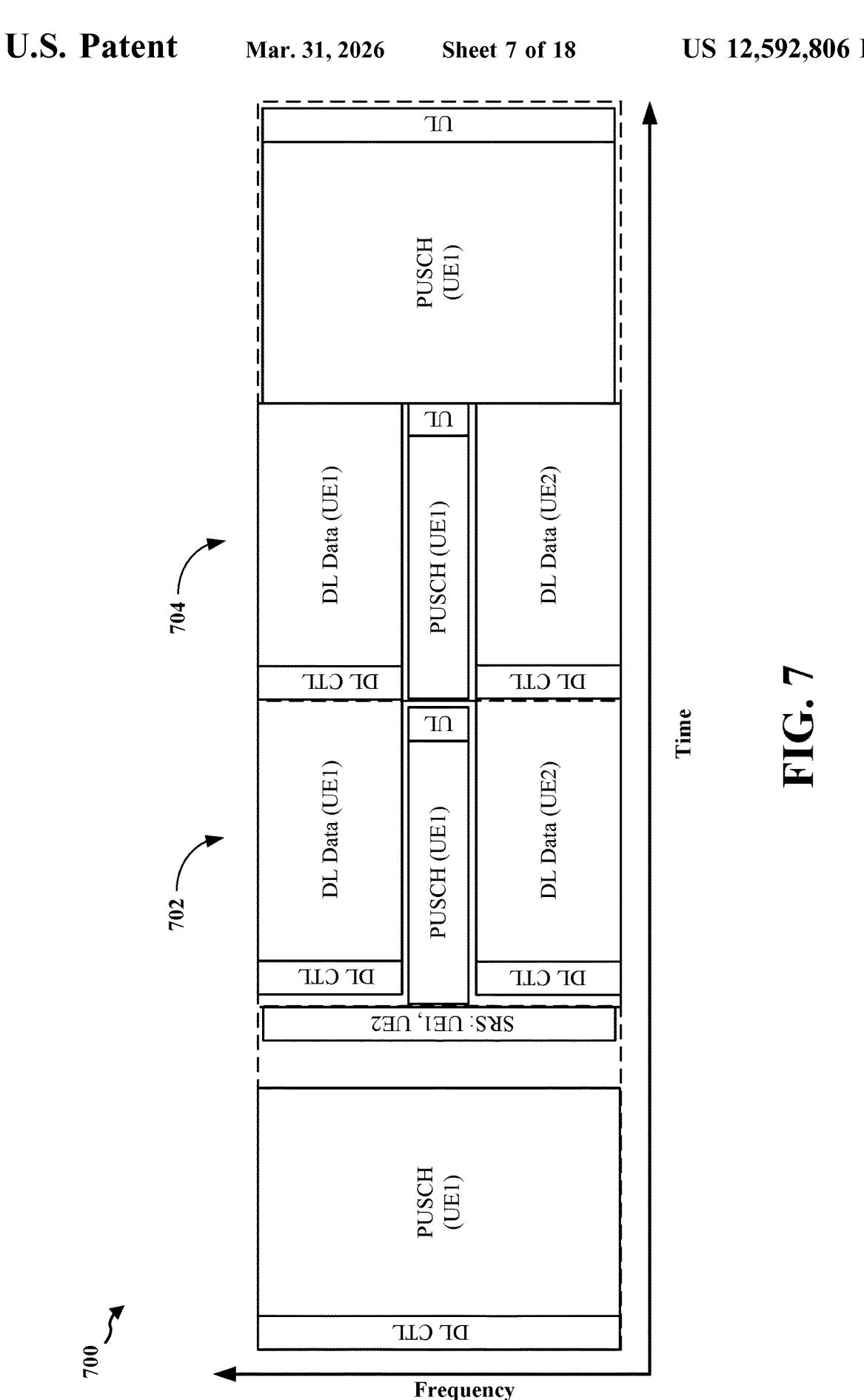
FIG. 7 is a diagram illustrating an SBFD slot format.

FIG. 7 is a diagram 700 illustrating an SBFD slot format. The slot format may provide flexibility in downlink and uplinks operations in time (e.g., across slots) and across different UEs. Time is represented across the subframes in the horizontal direction and frequency is represent in the vertical direction. A base station may provide a simultaneous PDSCH/PUSCH grant at a same subframe or slot 702 or 704 for different UEs (e.g., HD UEs) and/or a simultaneous UL/DL grant for FD UEs.

There may be many sources of interference at the UE. For example, if a UE is operating in HD mode and the base station is operating in SBFD or IBFD, there may be inter-cell interference from other base stations, intra-cell CLI (e.g., interference from UEs in the same cell), or inter-cell CLI (e.g., interference from UEs in adjacent cells). Additionally, there may be self-interference for FD UEs.

Figure 8:
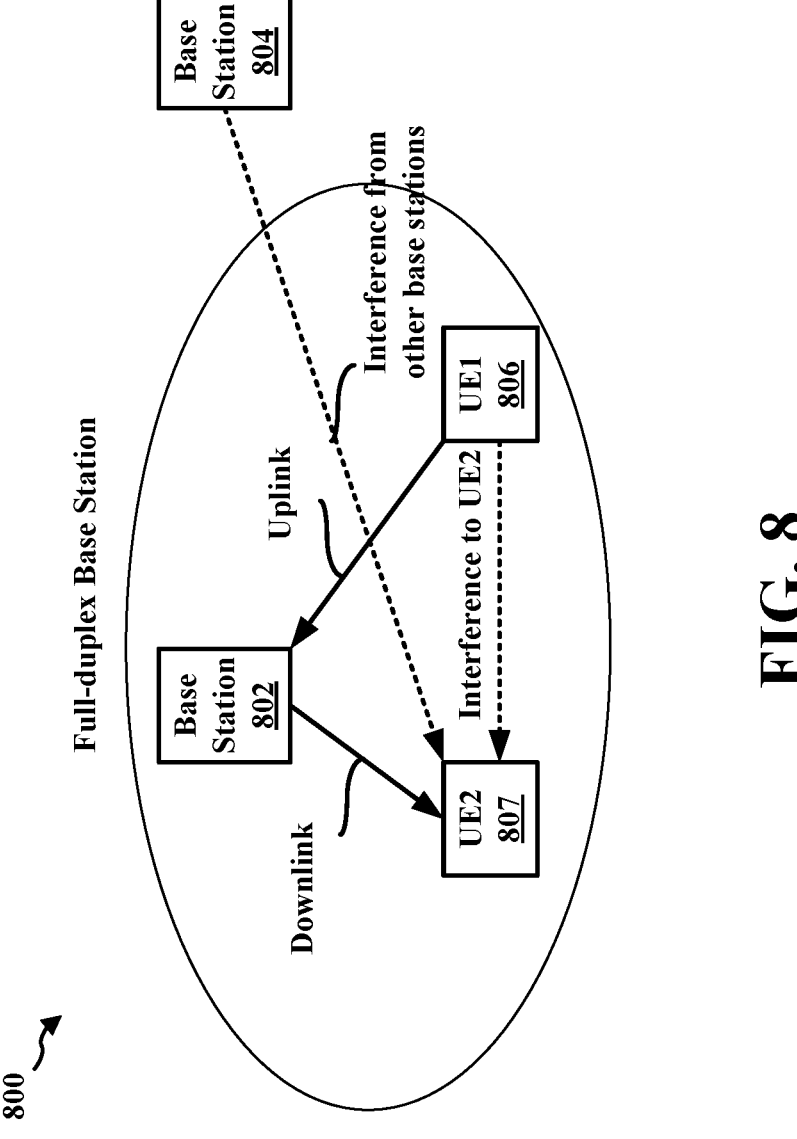
FIG. 8 shows an example of inter-cell interference from other base stations and intra-cell cross-link interference (CLI).

FIG. 8 is a diagram 800 illustrating an example of inter-cell interference from other base stations and intra-cell CLI. As shown in FIG. 8, the first UE 806 may transmit an uplink signal to the first base station 802. The second UE 807 may receive a downlink signal from the first base station 802. The second UE 807 may experience interference from a second base station 804 in an adjacent cell and/or intra-cell CLI from the second UE 807 in the same cell.

Figure 9:
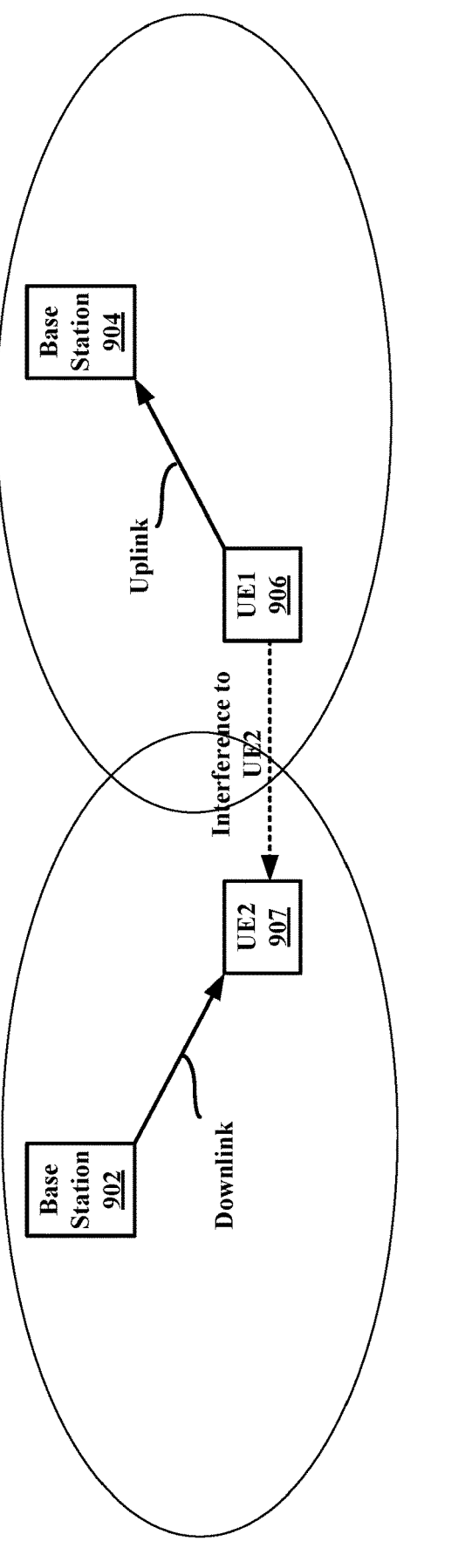
FIG. 9 shows an example of inter-cell CLI.

FIG. 9 is a diagram 900 illustrating an example of inter-cell CLI. As shown in FIG. 9, a first UE 906, in a first cell, may transmit an uplink signal to a second base station 904. A second UE 907, in a second cell adjacent to the first cell, may receive a downlink signal from a first base station 902. The second UE 907 experience inter-cell CLI from the first UE 906.

In SBFD, a base station can configure the downlink transmission to a UE in frequency domain resources adjacent to the frequency domain resources configured for uplink transmission of another UE. For example, in an SBFD scenario, a first UE may transmit an uplink signal in the middle of the band of a second slot, and a second UE may receive a downlink transmission from the base station in the adjacent frequency resources. The uplink transmission of the first UE may cause CLI to the downlink reception at the second UE. The CLI may be due to energy leakage caused by timing and frequency misalignment between the two UEs, or due to automatic gain control (AGC) mismatch if the second UE AGC is driven by the downlink serving cell signal of the second UE, but the CLI is stronger enough to saturate the AGC.

Figures 10A, 10B:
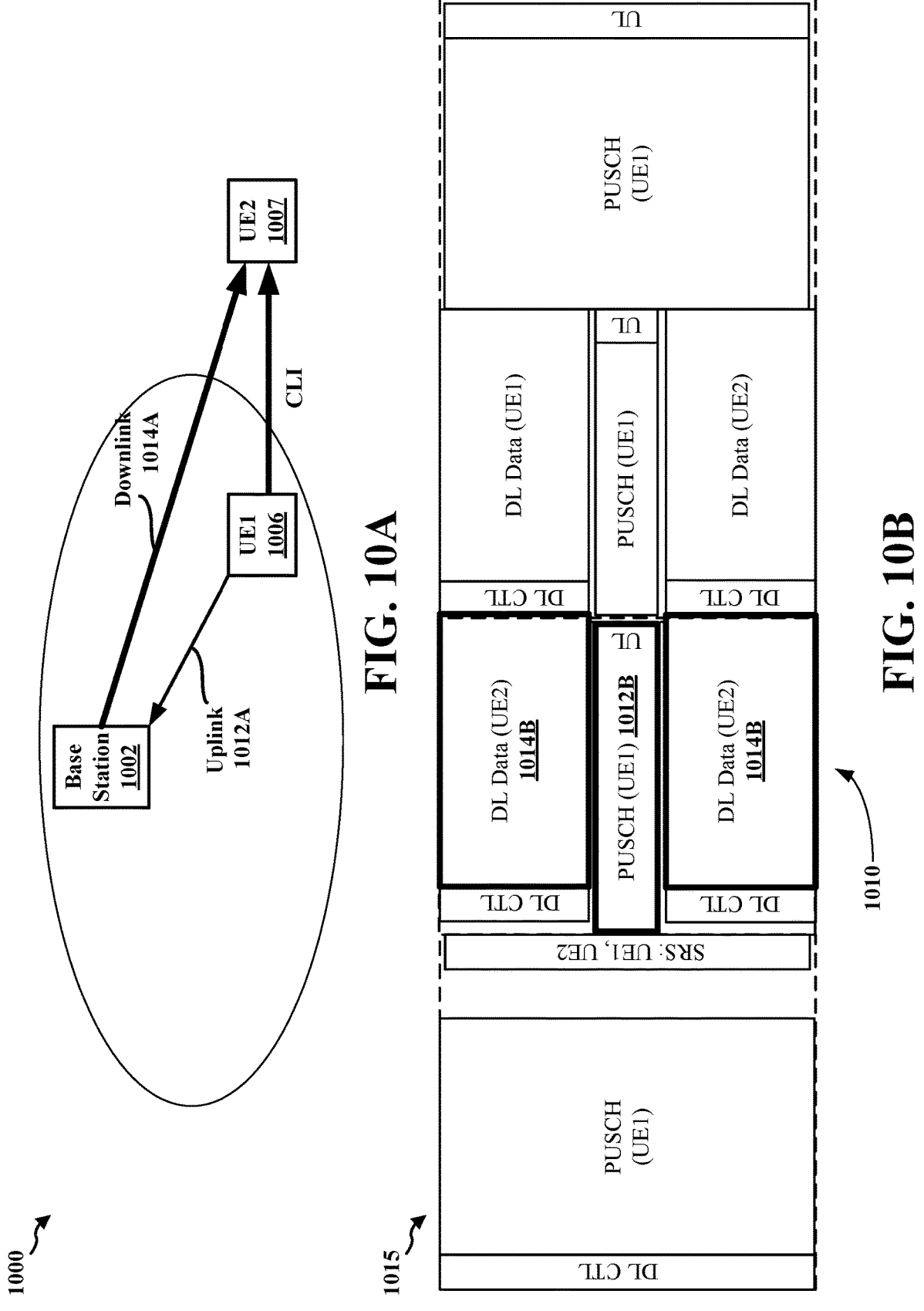
FIG. 10A illustrates an SBFD-based communication.
FIG. 10B illustrates an SBFD slot format.

For example, FIG. 10A illustrates an SBFD-based communication 1000. FIG. 10A will be described with reference to FIG. 10B. FIG. 10B illustrates an SBFD slot format 1015. As shown in FIG. 10A, the first UE 1006 may transmit an uplink signal 1012A (PUSCH (UE1) 1012B, as shown in FIG. 10B) to the base station 1002 in the middle of the band of a second slot 1010. A second UE 1007 may receive a downlink transmission 1014A (DL Data (UE2) 1014B, as shown in FIG. 10B) from the base station 1002. The uplink transmission of the first UE 1006 may cause CLI to the downlink reception at the second UE 1007.

Due to the increase of CLI in FD networks, failure in a PDSCH reception can be because of instantaneous channel conditions that did not meet the transmission parameters or because of an increased level of CLI. It may be beneficial to inform the network whether the failure occurred because of CLI or not. For example, if the network information about CLI is outdated and the failure occurred because of CLI, the network can do a better job in the retransmission by scheduling the uplink UEs in different resources without the need to reduce the modulation coding scheme. Even if the reception is successful, it can be useful to optimize the network scheduler based on information about the impact of CLI on the decoding performance. Various aspects of the present disclosure may enable the communication of the CLI impact on the decodability of the PDSCH reception in FD networks.

A UE may identify the CLI impact in many ways. For example, the UE may measure the received power in the uplink sub-band or may measure the LLR quality as a function of the gap with the downlink/uplink sub-band boundary. The LLR quality may represent the quality of LLRs of the coded bits at the UE. The LLR may be a soft decision that indicates the likelihood of the coded bit being a 1 or 0. The quality of the LLR may be utilized as a measure of CLI impact (e.g., of the performance of the decoder or the decodability of a downlink transmission (e.g., PDSCH)), where higher the LLR quality, the lesser the impact of the CLI, and lower the LLR quality, the greater the impact of the CLI.

Figure 11B:
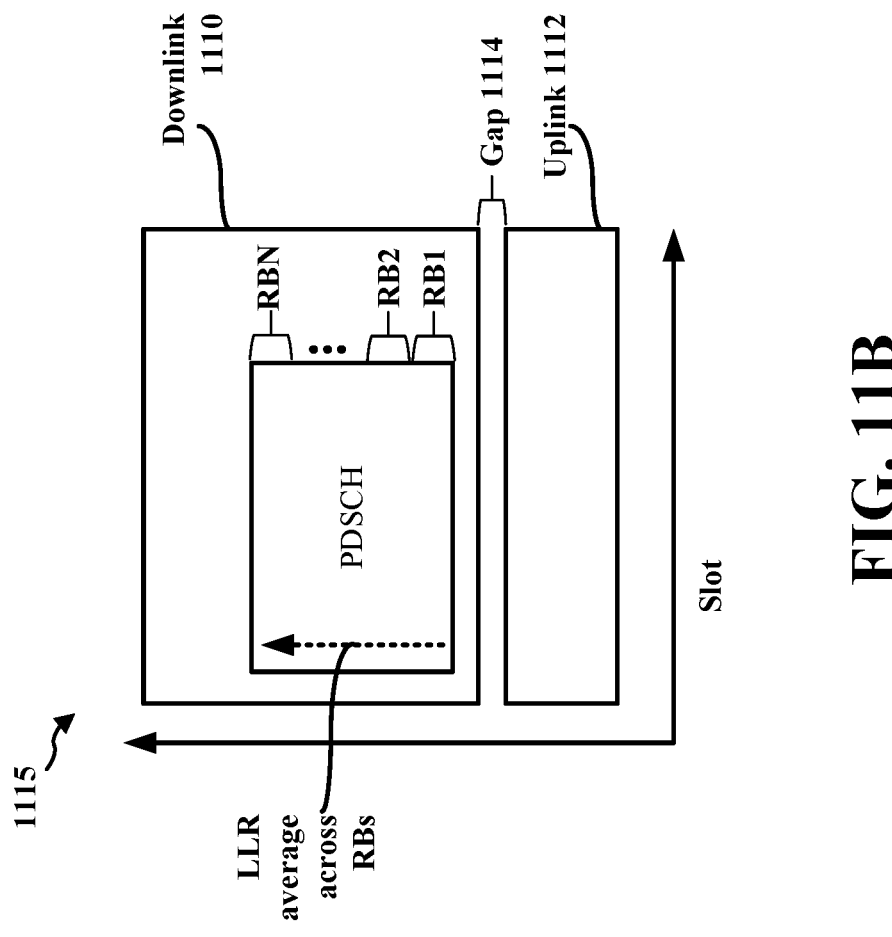
FIG. 11B is a diagram illustrating a downlink sub-band-based technique for measuring the CLI impact via an SBFD slot or symbol in accordance with various aspects of the present disclosure.
Figure 11A:
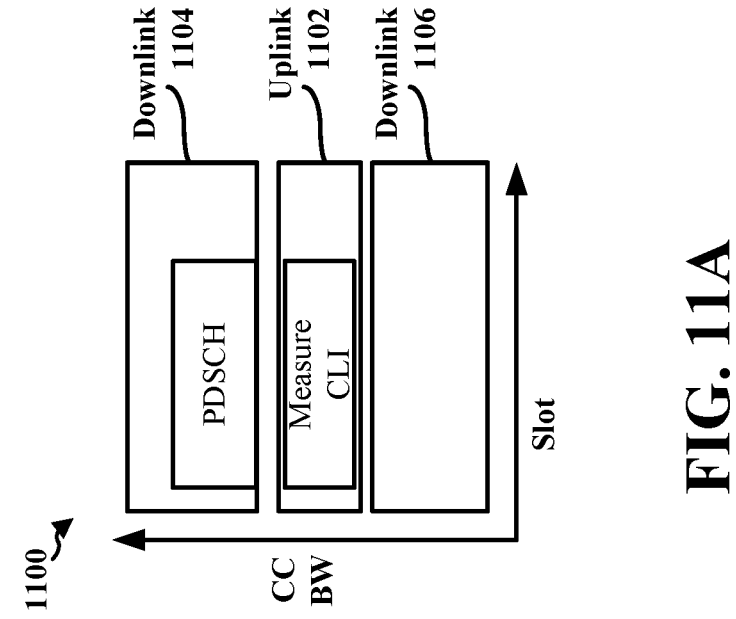
FIG. 11A is a diagram illustrating an uplink sub-band-based technique for measuring the CLI impact via an SBFD slot or symbol in accordance with various aspects of the present disclosure.

For DL receptions in SBFD symbols, for example, PDSCH or PDCCH, across one or more DL sub-bands, an SBFD-aware UE may measure the impact of CLI utilizing at least one of many techniques. For example, the UE may utilize an uplink sub-band (UL-SB)-based technique, where the UE measures the received interference power in the uplink sub-band during the reception of a downlink communication. For example, FIG. 11A is a diagram 1100 illustrating a UL-SB-based technique for measuring the CLI impact via an SBFD slot or symbol in accordance with various aspects of the present disclosure. As shown in FIG. 11A, a UE may measure the CLI impact by measuring the received interference power (e.g., the power level of the interference, for example, determined via a signal-to-interference ratio (SINR)) in an uplink sub-band 1102 (e.g., a sub-band, of an SBFD slot or symbol, configured for uplink transmission). The received interference power may be measured during the reception of a downlink communication (e.g., a PDSCH or PDCCH) in a downlink sub-band 1104 (or alternatively, downlink sub-band 1106), where the downlink sub-band 1104 and the downlink sub-band 1106 are sub-bands, of an SBFD slot or symbol, configured for downlink reception.

In another example, a UE may measure the CLI impact utilizing a downlink sub-band (DL-SB)-based technique, where the UE measures the LLR quality against the gap with the downlink/uplink sub-band for a number of resource blocks. The UE may be configured to report the difference between the average LLR of a first X RBs allocated for the downlink transmission and the average LLR of a second (e.g., last) Y RBs allocated for the downlink transmission, where each of X and Y is any positive integer. FIG. 11B is a diagram 1115 illustrating a DL-SB-based technique for measuring the CLI impact via an SBFD slot or symbol in accordance with various aspects of the present disclosure. As shown in FIG. 11B, the SBFD slot or symbol includes a downlink sub-band 1110 and an uplink sub-band 1112, which are separated by a gap 1114 (or a particular frequency range), which corresponds to a boundary between the downlink sub-band 1110 and the uplink sub-band 1112. As also shown in FIG. 11B, a downlink reception (e.g., a PDSCH) may have an N number of resource blocks (e.g., RB1 . . . . RBN) allocated therefor. The UE may be configured to determine an average LLR of a first set of RBs (e.g., RB1) in a first frequency range and a second set of RBs (RBN) in a second frequency range. For instance, the UE may determine the LLR for RBs in the first set and average the LLRs to determine the average LLR for the first set. Similarly, the UE may determine the LLR for RBs in the second set and average the LLRs to determine the average LLR for the second set. The UE may determine a difference between the determined average LLR of the first set and the determined average LLR of the second set and report the difference as the LLR quality to a network node. In some aspects, the first set of RBs may be the closest RBs to the gap 1114 (e.g., RB1), and the second set of RBs may be the furthest RBs from the gap 1114 (e.g., RBN). However, it is noted that an average LLR for any two or more sets of RBs may be determined. In some aspects, the set of RBs for which the average LLRs are to be determined by the UE may be signaled by the network node.

In some aspects, for the UL-SB-based CLI impact measurement, the CLI impact may be reported via one or more bits that indicate a range of received interference power in the uplink sub-band. This range and its mapping to the bit values may be preconfigured or predefined or may be RRC-configured (e.g., by the network node). For example, one bit may be utilized to indicate whether there is excessive CLI or not (e.g., whether the received interference power (or excessive CLI) exceeds a threshold).

In some aspects, for the DL-SB-based CLI impact measurement, the CLI impact may be reported via one or more bits that indicate the LLR across the RBs. The number of RBs (X or Y) (i.e., the sets of RBs) for which the average LLR is to be reported may be RRC-configured (e.g., by the network node) and the difference in the average LLRs may have a range and mapping to values of bits that are RRC-configured or preconfigured/predefined.

In some aspects, the reporting of the CLI (via one or more bits) may either be layer 1 (L1)-based, layer 2 (L2)-based, UCI-based, or PUSCH-based. For instance, the L1-based reporting may be part of the HARQ-ACK codebook or report (e.g., a turbo HARQ-ACK report). The HARQ-ACK codebook may include one or more bits that indicate whether or not reception of a channel or signal is successful. L1-based reporting may enable simultaneous downlink reception and CLI measurements (e.g., to increase HARQ bits to 1+N bits, where N bits are used for CLI, and where N is any positive integer). L1-based reporting may also be utilized to indicate to the network node whether a negative ACK (NACK) is due to excessive CLI or not. For example, two bits may be utilized for reporting an ACK, a NACK, or a NACK-CLI (which indicates whether a NACK is due to excessive CLI or not). L2-based reporting may be event-triggered. For example, L2-based reporting may utilize a dedicated MAC-control element (CE) that is either persistent or semi-persistent. The triggering event may be based on whether the CLI exceeds a threshold. UCI-based reporting may utilize a separate UCI (or UCI dedicated for reporting the CLI impact). PUSCH-based reporting may utilize the payload of a PUSCH, where multiple reports may be multiplexed in a similar manner as a HARQ-ACK.

Various triggers may be utilized the reporting. For instance, in one aspect, the network (e.g., a network node) may configure the UE to report the CLI impact on PDSCH decodability via an RRC configuration. In another aspect, the UE may always report the CLI impact until it is reconfigured or a DCI signals the deactivation of the reporting. A DCI may also signal the activation of the reporting. In further aspects, the DCI scheduling the PDSCH may include an extra bit that informs whether or not the UE is to report the CLI impact.

Figure 12:
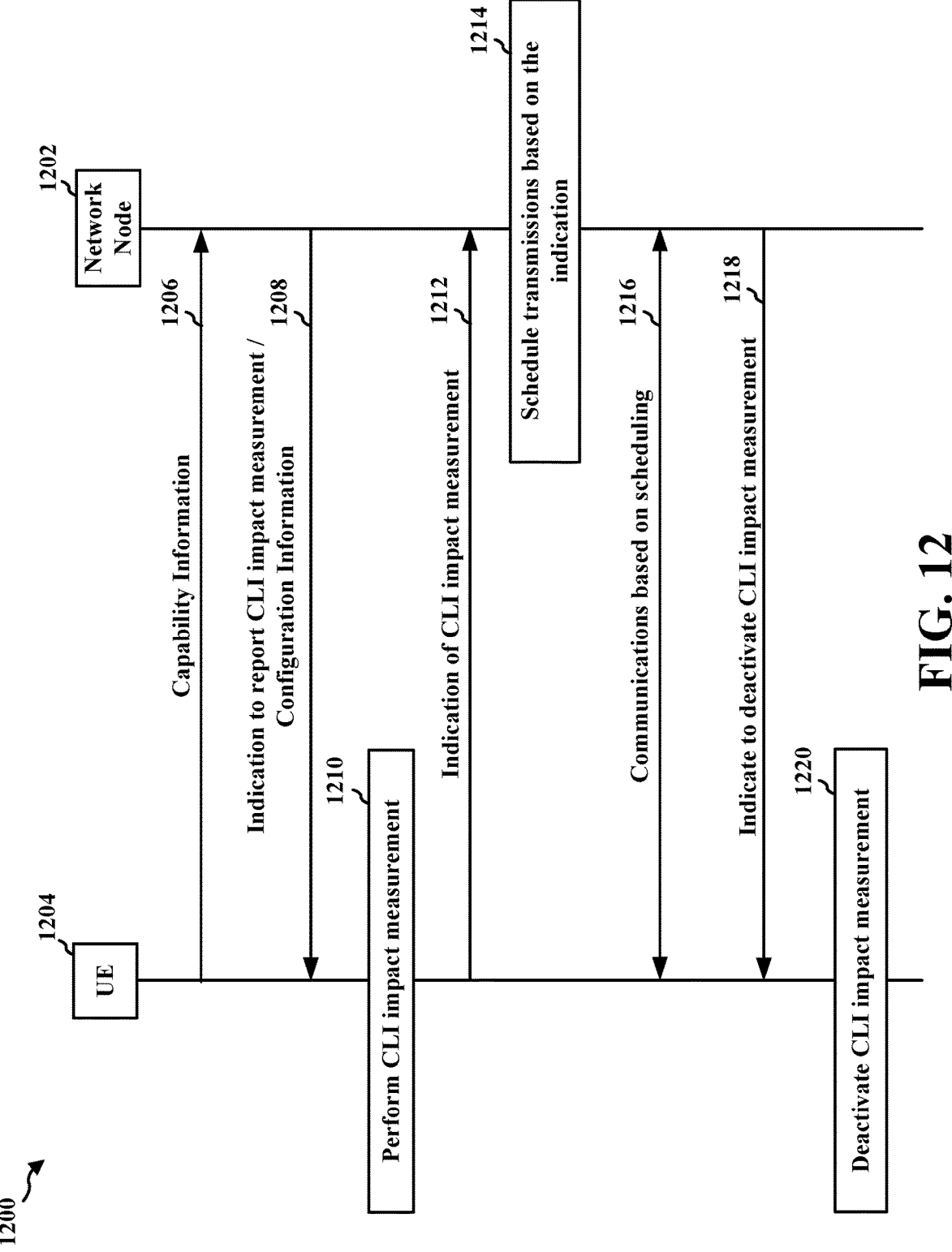
FIG. 12 is a call flow diagram illustrating a method of wireless communication, in accordance with various aspects of this present disclosure.

FIG. 12 is a call flow diagram 1200 illustrating a method of wireless communication in accordance with various aspects of the present disclosure. As shown in FIG. 12, the call flow diagram 1200 includes a network node 1202 and a UE 1204. The UE 1204 may be an example of the UE 104, the UE 350, the first UE 506, the second UE 507, the first UE 606, the second UE 607, the first UE 806, the second UE 807, the first UE 906, the second UE 907, the first UE 1006, or the second UE 1007. The network node 1202 may be an example of the base station 102, the base station 310, the first base station 502, the second base station 504, the first base station 602, the second base station 604, the first base station 802, the second base station 804, the first base station 902, the second base station 904, or the base station 1002. Although aspects are described for the network node 1202, the aspects may be performed by the network node 1202 in aggregation and/or by one or more components of the network node 1202 (e.g., such as a CU 110, a DU 130, and/or an RU 140). As shown in FIG. 12, at 1206, the UE 1204 may provide capability information to the network node 1202. The capability information may indicate to the network node 1202 that the UE 1204 supports CLI impact reporting and/or may indicate the types of CLI impact measurement (e.g., UL-SB-based CLI impact measurement, DL-SB-based CLI impact measurement, etc.) supported by the UE 1204.

At 1208, the network node 1202 may provide an indication to report CLI impact measurement(s) with respect to an SBFD slot or symbol and/or may provide configuration information. The network node 1202 may provide the indication and/or configuration information based on (e.g., responsive to) the capability information received at 1206. The configuration information may indicate which type of CLI impact measurement is to be used by the UE 1204, which sets of RBs are to be utilized for LLR measurement for the DL-SB-based CLI measurement, and/or the mapping between different ranges of the measured CLI (either in terms of received interference power or LLR quality) and bit(s) used to report the CLI measurement. For instance, each range may correspond to a particular bit value. The mapping may specify the particular bit value(s) for each range. The configuration information may also indicate a threshold to which the measured CLI is compared. The UE 1204 may utilize the threshold to determine whether the CLI is excessive. The configuration information and/or the indication may be provided to the UE 1204 as an RRC configuration (e.g., the configuration information and/or the indication may be provided via RRC-based signaling). In some aspects, the configuration information and/or the indication may be provided to the UE 1204 via a MAC-CE or DCI. In some aspects, the mapping(s) may be predefined/preconfigured rather than being signaled to the UE 1204 via the configuration information.

At 1210, the UE 1204 may perform the measurement of the CLI impact based on the indication to report the measurement received at 1208. In some aspects, the UE 1204 may perform a measurement of at least one of (1) a received interference power in a first sub-band configured for uplink transmission (e.g., the uplink sub-band 1102) of the SBFD slot or symbol during a physical downlink shared channel (PDSCH) or physical downlink control channel (PDCCH) reception in a second sub-band configured for downlink reception (e.g., the downlink sub-band 1104) of the SBFD slot or symbol, or (2) an LLR quality, for a plurality of resource blocks (e.g., RB1, RB2, . . . , RBN (as shown in FIG. 11B) based on a gap (e.g., the gap 1114) corresponding to a boundary between the first sub-band configured for the uplink transmission (e.g., the uplink sub-band 1112) of the SBFD slot or symbol and the second sub-band configured for the downlink reception (e.g., the downlink sub-band 1110) of the SBFD slot or symbol.

In some aspects, to determine the LLR quality, the UE 1204 may determine a first average LLR of a first subset of the plurality of resource blocks (e.g., RB1) and determine a second average LLR of a second subset of the plurality of resource blocks (e.g., RBN). The UE 1204 may perform the measurement based on the first average LLR and the second average LLR. For example, the UE 1204 may determine a difference between the first average LLR and the second average LLR. The measurement may be based on the difference between the first average LLR and the second average LLR.

In some aspects, the first subset of the plurality of resource blocks is located within a first frequency range, the second subset of the plurality of resource blocks is located with a second frequency range that is different than the first frequency range, and the gap is within a third frequency range. In some aspects, the first frequency range may be relatively closer to the third frequency range than the second frequency range.

At 1212, the UE 1204 may transmit an indication of the CLI impact measurement (e.g., the measurement of the received interference power and/or the LLR quality) to the network node 1202.

In some aspects, the indication of the CLI impact measurement may be transmitted via at least one of an HARQ-ACK codebook, a MAC-CE, UCI, or a payload of a PUSCH.

In some aspects, the indication of the measurement of the LLR quality may include bit(s) that indicate a range (e.g., as defined by the mapping described above) in which the difference is included.

In some aspects, the indication of the measurement of the received interference power may include bit(s) that indicate range (e.g., as defined by the mapping described above) of the received interference power.

At 1214, the network node 1202 may schedule transmission based on the indication received at 1212. For instance, the network node 1202 may update its network scheduler to schedule transmissions (e.g., uplink and/or downlink transmissions) to lessen the CLI impact on the decoder of the UE 1204. At 1216, the network node 1202 and the UE 1204 may communicate with each other based on the updated scheduling performed at 1214.

At 1218, the network node 1202 may provide an indication to the UE 1204 to deactivate CLI impact measurement. In some aspects, the indication may be provided to the UE 1204 via DCI.

At 1220, the UE 1204 may deactivate CLI impact measurement based on receiving the indication at 1218. For example, the UE 1204 may deactivate the transmission of the indication of CLI impact measurement (e.g., as transmitted at 1212).

FIG. 13 is a flowchart 1300 illustrating methods of wireless communication at a UE in accordance with various aspects of the present disclosure. In some aspects, the UE may be the UE 104, the UE 350, the first UE 506, the second UE 507, the first UE 606, the second UE 607, the first UE 806, the second UE 807, the first UE 906, the second UE 907, the first UE 1006, or the second UE 1007, or the apparatus 1704 in the hardware implementation of FIG. 17.

At 1302, the UE may receive a first indication to report a measurement of CLI in an SBFD slot or symbol. For example, referring to FIG. 12, the UE 1204, at 1208, may receive a first indication to report a measurement of CLI in an SBFD slot or symbol. In an aspect, 1302 may be performed by the CLI impact measurement component 198.

In some aspects, the UE may receive the first indication via at least one of an RRC configuration or DCI. For example, referring to FIG. 12, at 1208, the UE 1204 may receive the first indication via at least one of an RRC configuration or DCI.

At 1304, the UE may perform, based on the first indication to report the measurement of the CLI, a measurement of at least one of (1) a received interference power in a first sub-band configured for uplink transmission of the SBFD slot or symbol during a PDSCH or PDCCH reception in a second sub-band configured for downlink reception of the SBFD slot or symbol or (2) an LLR quality, for a plurality of resource blocks, based on a gap corresponding to a boundary between the first sub-band configured for the uplink transmission of the SBFD slot or symbol and the second sub-band configured for the downlink reception of the SBFD slot or symbol. For example, referring to FIG. 12, the UE 1204, at 1210, may perform, based on the first indication to report the measurement of the CLI, a measurement of at least one of (1) a received interference power in a first sub-band configured for uplink transmission (e.g., the uplink sub-band 1102) of the SBFD slot or symbol during a PDSCH or PDCCH reception in a second sub-band configured for downlink reception (e.g., the downlink sub-band 1104) of the SBFD slot or symbol or (2) an LLR quality, for a plurality of resource blocks (e.g., RB1 .... RBN, as shown in FIG. 11B), based on a gap (e.g., the gap 1114) corresponding to a boundary between the first sub-band configured for the uplink transmission (e.g., the uplink sub-band 1112) of the SBFD slot or symbol and the second sub-band configured for the downlink reception (e.g., the downlink sub-band 1110) of the SBFD slot or symbol. In an aspect, 1304 may be performed by the CLI impact measurement component 198.

In some aspects, the UE may perform the measurement of the LLR quality by determining a first average LLR of a first subset of the plurality of resource blocks, determining a second average LLR of a second subset of the plurality of resource blocks, and performing the measurement based on the first average LLR and the second average LLR. For example, at 1210, the UE 1204 may perform the measurement of the LLR quality by determining a first average LLR of a first subset of the plurality of resource blocks (e.g., RB1, . . . , RBN, as shown in FIG. 11B), determining a second average LLR of a second subset of the plurality of resource blocks, and performing the measurement based on the first average LLR and the second average LLR.

In some aspects, the UE may perform the measurement based on the first average LLR and the second average LLR by determining a difference between the first average LLR and the second average LLR, where the measurement is based on the difference between the first average LLR and the second average LLR. For example, referring to FIG. 12, at 1210, the UE may perform the measurement based on the first average LLR and the second average LLR by determining a difference between the first average LLR and the second average LLR, where the measurement is based on the difference between the first average LLR and the second average LLR. In some aspects, the first subset of the plurality of resource blocks may be located within a first frequency range, and the second subset of the plurality of resource blocks may be located with a second frequency range that is different than the first frequency range. For example, referring to FIG. 12, the first subset of the plurality of resources blocks for which the first average LLR is determined at 1210 may be located within a first frequency range, and the second subset of the plurality of resources blocks for which the second average LLR is determined at 1210 may be located within a second frequency range that is different than the first frequency range.

In some aspects, the gap may be within a third frequency range, and the first frequency range may be relatively closer to the third frequency range than the second frequency range. For example, referring to FIG. 12, the gap (e.g., the gap 1114) on which the LLR quality measurement at 1210 is based may be within a third frequency range, and the first frequency range may be relatively closer to the third frequency range than the second frequency range.

At 1306, the UE may transmit a second indication of the measurement of at least one of (1) the received interference power or (2) the LLR quality. For example, referring to FIG. 12, the UE 1204, at 1212, may transmit a second indication of the measurement of at least one of (1) the received interference power or (2) the LLR quality. In an aspect, 1306 may be performed by the CLI impact measurement component 198.

In some aspects, the UE may transmit the second indication of the measurement via at least one of a HARQ-ACK codebook, a MAC-CE, UCI, or a payload of a PUSCH. For example, referring to FIG. 12, the UE 1204, at 1212, may transmit the second indication of the measurement via at least one of a HARQ-ACK codebook, a MAC-CE, UCI, or a payload of a PUSCH.

In some aspects, the second indication of the measurement of the LLR quality may include bit(s) that indicate a range in which the difference is included. For example, referring to FIG. 12, the second indication of the measurement of the LLR quality transmitted by the UE 1204 at 1212 may include bit(s) that indicate a range in which the difference is included.

In some aspects, a mapping between the one or more bits and the range may be preconfigured or predefined. For example, referring to FIG. 12, a mapping between the bit(s) and the range indicated in the second indication at 1212 may be preconfigured or predefined.

In some aspects, a mapping between the one or more bits and the range may be configured via RRC signaling. For example, referring to FIG. 12, at 1208, the network node 1202 may provide the mapping between the bit(s) and the range via RRC signaling.

In some aspects, the second indication of the measurement of the received interference power may include bit(s) that indicate a range of the received interference power. For example, referring to FIG. 12, the second indication of the measurement of the received interference power transmitted by the UE 1204 at 1212 may include bit(s) that indicate a range of the received interference power.

In some aspects, a mapping between the bit(s) and the range may be preconfigured or predefined. For example, referring to FIG. 12, a mapping between the bit(s) and the range indicated in the second indication at 1212 may be preconfigured or predefined.

In some aspects, a mapping between the bit(s) and the range may be configured via RRC signaling. For example, referring to FIG. 12, at 1208, the network node 1202 may provide the mapping between the bit(s) and the range via RRC signaling.

In some aspects, the UE may receive a third indication to deactivate a reporting of the measurement, where the transmission of the second indication is deactivated based on the third indication. For example, referring to FIG. 12, at 1218, the UE 1204 may receive a third indication to deactivate a reporting of the measurement. At 1220, the UE 1204 may deactivate the transmission of the second indication based on the third indication.

In some aspects, the UE may receive the third indication via DCI. For example, referring to FIG. 12, at 1218, the UE 1204 may receive the third indication via DCI.

Figure 14:
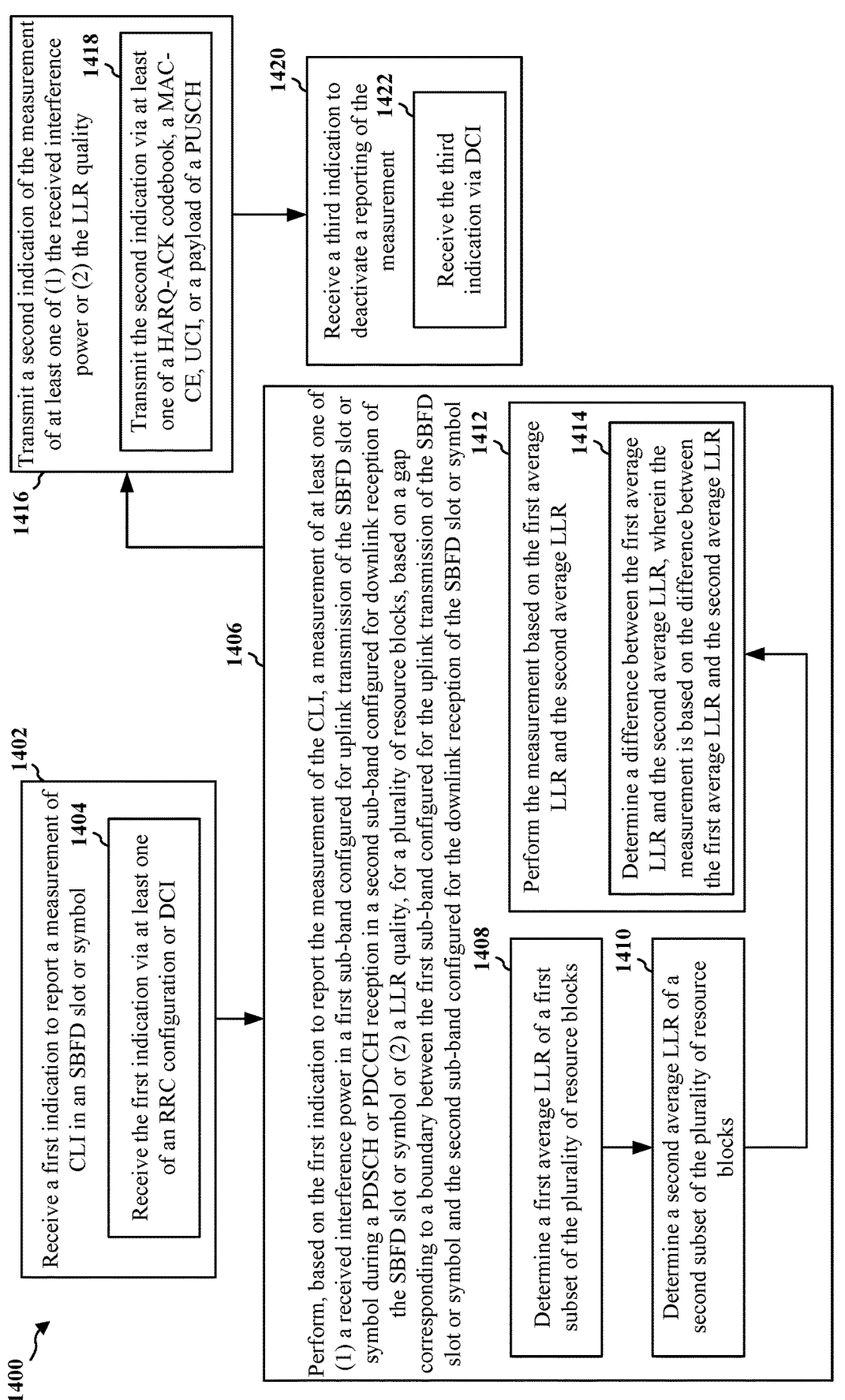
FIG. 14 is a flowchart illustrating methods of wireless communication in accordance with various aspects of the present disclosure.

FIG. 14 is a flowchart 1400 illustrating methods of wireless communication at a UE in accordance with various aspects of the present disclosure. In some aspects, the UE may be the UE 104, the UE 350, the first UE 506, the second UE 507, the first UE 606, the second UE 607, the first UE 806, the second UE 807, the first UE 906, the second UE 907, the first UE 1006, or the second UE 1007, or the apparatus 1704 in the hardware implementation of FIG. 17.

At 1402, the UE may receive a first indication to report a measurement of CLI in an SBFD slot or symbol. For example, referring to FIG. 12, the UE 1204, at 1208, may receive a first indication to report a measurement of CLI in an SBFD slot or symbol. In an aspect, 1402 may be performed by the CLI impact measurement component 198.

In some aspects, as part of 1402, at 1404, the UE may receive the first indication via at least one of an RRC configuration or DCI. For example, referring to FIG. 12, at 1208, the UE 1204 may receive the first indication via at least one of an RRC configuration or DCI. In an aspect, 1404 may be performed by the CLI impact measurement component 198.

At 1406, the UE may perform, based on the first indication to report the measurement of the CLI, a measurement of at least one of (1) a received interference power in a first sub-band configured for uplink transmission of the SBFD slot or symbol during a PDSCH or PDCCH reception in a second sub-band configured for downlink reception of the SBFD slot or symbol or (2) an LLR quality, for a plurality of resource blocks, based on a gap corresponding to a boundary between the first sub-band configured for the uplink transmission of the SBFD slot or symbol and the second sub-band configured for the downlink reception of the SBFD slot or symbol. For example, referring to FIG. 12, the UE 1204, at 1210, may perform, based on the first indication to report the measurement of the CLI, a measurement of at least one of (1) a received interference power in a first sub-band configured for uplink transmission (e.g., the uplink sub-band 1102) of the SBFD slot or symbol during a PDSCH or PDCCH reception in a second sub-band configured for downlink reception (e.g., the downlink sub-band 1104) of the SBFD slot or symbol or (2) an LLR quality, for a plurality of resource blocks (e.g., RB1, . . . , RBN, as shown in FIG. 11B), based on a gap (e.g., the gap 1114) corresponding to a boundary between the first sub-band configured for the uplink transmission (e.g., the uplink sub-band 1112) of the SBFD slot or symbol and the second sub-band configured for the downlink reception (e.g., the downlink sub-band 1110) of the SBFD slot or symbol. In an aspect, 1406 may be performed by the CLI impact measurement component 198.

In some aspects, as part of 1406, at 1408, the UE may perform the measurement of the LLR quality by determining a first average LLR of a first subset of the plurality of resource blocks. For example, at 1210, the UE 1204 may perform the measurement of the LLR quality by determining a first average LLR of a first subset of the plurality of resource blocks (e.g., RB1, . . . , RBN, as shown in FIG. 11B). In an aspect, 1408 may be performed by the CLI impact measurement component 198.

In some aspects, as part of 1406, at 1410, the UE may determine a second average LLR of a second subset of the plurality of resource blocks. For example, at 1210, the UE 1204 may determine a second average LLR of a second subset of the plurality of resource blocks. In an aspect, 1410 may be performed by the CLI impact measurement component 198.

In some aspects, as part of 1406, at 1412, the UE may perform the measurement based on the first average LLR and the second average LLR. For example, at 1210, the UE 1204 may perform the measurement based on the first average LLR and the second average LLR. In an aspect, 1412 may be performed by the CLI impact measurement component 198.

In some aspects, as part of 1412, at 1414, the UE may perform the measurement based on the first average LLR and the second average LLR by determining a difference between the first average LLR and the second average LLR, where the measurement is based on the difference between the first average LLR and the second average LLR. For example, referring to FIG. 12, at 1210, the UE may perform the measurement based on the first average LLR and the second average LLR by determining a difference between the first average LLR and the second average LLR, where the measurement is based on the difference between the first average LLR and the second average LLR. In an aspect, 1414 may be performed by the CLI impact measurement component 198.

In some aspects, the first subset of the plurality of resource blocks may be located within a first frequency range, and the second subset of the plurality of resource blocks may be located with a second frequency range that is different than the first frequency range. For example, referring to FIG. 12, the first subset of the plurality of resources blocks for which the first average LLR is determined at 1210 may be located within a first frequency range, and the second subset of the plurality of resources blocks for which the second average LLR is determined at 1210 may be located within a second frequency range that is different than the first frequency range.

In some aspects, the gap may be within a third frequency range, and the first frequency range may be relatively closer to the third frequency range than the second frequency range. For example, referring to FIG. 12, the gap (e.g., the gap 1114) on which the LLR quality measurement at 1210 is based may be within a third frequency range, and the first frequency range may be relatively closer to the third frequency range than the second frequency range.

At 1416, the UE may transmit a second indication of the measurement of at least one of (1) the received interference power or (2) the LLR quality. For example, referring to FIG. 12, the UE 1204, at 1212, may transmit a second indication of the measurement of at least one of (1) the received interference power or (2) the LLR quality. In an aspect, 1416 may be performed by the CLI impact measurement component 198.

In some aspects, as part of 1416, at 1418, the UE may transmit the second indication of the measurement via at least one of a HARQ-ACK codebook, a MAC-CE, UCI, or a payload of a PUSCH. For example, referring to FIG. 12, the UE 1204, at 1212, may transmit the second indication of the measurement via at least one of a HARQ-ACK codebook, a MAC-CE, UCI, or a payload of a PUSCH.

In some aspects, the second indication of the measurement of the LLR quality may include bit(s) that indicate a range in which the difference is included. For example, referring to FIG. 12, the second indication of the measurement of the LLR quality transmitted by the UE 1204 at 1212 may include bit(s) that indicate a range in which the difference is included.

In some aspects, a mapping between the one or more bits and the range may be preconfigured or predefined. For example, referring to FIG. 12, a mapping between the bit(s) and the range indicated in the second indication at 1212 may be preconfigured or predefined.

In some aspects, a mapping between the one or more bits and the range may be configured via RRC signaling. For example, referring to FIG. 12, at 1208, the network node 1202 may provide the mapping between the bit(s) and the range via RRC signaling.

In some aspects, the second indication of the measurement of the received interference power may include bit(s) that indicate a range of the received interference power. For example, referring to FIG. 12, the second indication of the measurement of the received interference power transmitted by the UE 1204 at 1212 may include bit(s) that indicate a range of the received interference power.

In some aspects, a mapping between the bit(s) and the range may be preconfigured or predefined. For example, referring to FIG. 12, a mapping between the bit(s) and the range indicated in the second indication at 1212 may be preconfigured or predefined.

In some aspects, a mapping between the bit(s) and the range may be configured via RRC signaling. For example, referring to FIG. 12, at 1208, the network node 1202 may provide the mapping between the bit(s) and the range via RRC signaling.

At 1420, the UE may receive a third indication to deactivate a reporting of the measurement, where the transmission of the second indication is deactivated based on the third indication. For example, referring to FIG. 12, at 1218, the UE 1204 may receive a third indication to deactivate a reporting of the measurement. At 1220, the UE 1204 may deactivate the transmission of the second indication based on the third indication. In an aspect, 1420 may be performed by the CLI impact measurement component 198.

In some aspects, as part of 1420, at 1422 the UE may receive the third indication via DCI. For example, referring to FIG. 12, at 1218, the UE 1204 may receive the third indication via DCI. In an aspect, 1422 may be performed by the CLI impact measurement component 198.

FIG. 15 is a flowchart 1500 illustrating methods of wireless communication at a network node in accordance with various aspects of the present disclosure. In some aspects, the network node may be base station 102, the base station 310, the first base station 502, the second base station 504, the first base station 602, the second base station 604, the first base station 802, the second base station 804, the first base station 902, the second base station 904, or the base station 1002, or the network entity 1802 in the hardware implementation of FIG. 18.

At 1502, the network node may provide, for a UE, a first indication to report a measurement of cross-link interference in an SBFD slot or symbol. For example, referring to FIG. 12, at 1208, the network node 1202 may provide, for the UE 1204, a first indication to report a measurement of cross-link interference in an SBFD slot or symbol. In an aspect, 1502 may be performed by the scheduling component 199.

In some aspects, the network node may provide, for the UE, the first indication via at least one of an RRC configuration or DCI. For example, referring to FIG. 12, at 1208, the network node 1202 may provide, for the UE 1204, the first indication via at least one of an RRC configuration or DCI.

At 1504, the network node may receive a second indication of the measurement of at least one of (1) a received interference power in a first sub-band configured for uplink transmission of the SBFD slot or symbol during a PDSCH or PDCCH reception at the UE in a second sub-band configured for downlink reception of the SBFD slot or symbol or (2) an LLR quality, for a plurality of resource blocks, based on a gap corresponding to a boundary between the first sub-band configured for the uplink transmission of the SBFD slot or symbol and the second sub-band configured for the downlink reception of the SBFD slot or symbol. For example, referring to FIG. 12, at 1212, the network node 1202 may receive a second indication of the measurement of at least one of (1) a received interference power in a first sub-band configured for uplink transmission (e.g., the uplink sub-band 1102) of the SBFD slot or symbol during a PDSCH or PDCCH reception at the UE in a second sub-band configured for downlink reception (e.g., the downlink sub-band 1104) of the SBFD slot or symbol or (2) an LLR quality, for a plurality of resource blocks (e.g., RB1, . . . , RBN, as shown in FIG. 11B), based on a gap (e.g., the gap 1114) corresponding to a boundary between the first sub-band configured for the uplink transmission (e.g., the uplink sub-band 1112) of the SBFD slot or symbol and the second sub-band configured for the downlink reception (e.g., the downlink sub-band 1110) of the SBFD slot or symbol. In an aspect, 1504 may be performed by the scheduling component 199.

In some aspects, the network node may receive the second indication of the measurement via at least one of a HARQ-ACK codebook, a MAC-CE, UCI, or a payload of a PUSCH. For example, referring to FIG. 12, the network node 1202, at 1212, may receive the second indication of the measurement via at least one of a HARQ-ACK codebook, a MAC-CE, UCI, or a payload of a PUSCH.

In some aspects, the measurement of the LLR quality is based on a difference between a first average LLR of a first subset of the plurality of resource blocks and a second average LLR of a second subset of the plurality of resource blocks. For example, referring to FIG. 12, the measurement of the LLR quality received at 1212 may be based on a difference between a first average LLR of a first subset of the plurality of resource blocks and a second average LLR of a second subset of the plurality of resource blocks.

In some aspects, the second indication of the measurement of the LLR quality may include bit(s) that indicate a range in which the difference is included. For example, referring to FIG. 12, the second indication of the measurement of the LLR quality received at 1212 may include bit(s) that indicate a range in which the difference is included.

In some aspects, a mapping between the bit(s) and the range may be preconfigured or predefined. For example, referring to FIG. 12, a mapping between the bit(s) and the range indicated in the second indication at 1212 may be preconfigured or predefined.

In some aspects, a mapping between the bit(s) and the range may be configured via RRC signaling. For example, referring to FIG. 12, at 1208, the network node 1202 may provide the mapping between the bit(s) and the range via RRC signaling.

In some aspects, the first subset of the plurality of resource blocks may be located within a first frequency range, and the second subset of the plurality of resource blocks may be located with a second frequency range that is different than the first frequency range. For example, referring to FIG. 12, the first subset of the plurality of resources blocks for which the first average LLR is determined at 1210 may be located within a first frequency range, and the second subset of the plurality of resources blocks for which the second average LLR is determined at 1210 may be located within a second frequency range that is different than the first frequency range.

In some aspects, the gap may be within a third frequency range, and the first frequency range may be relatively closer to the third frequency range than the second frequency range. For example, referring to FIG. 12, the gap (e.g., the gap 1114) on which the LLR quality measurement at 1210 is based may be within a third frequency range, and the first frequency range may be relatively closer to the third frequency range than the second frequency range.

In some aspects, the second indication of the measurement of the received interference power may include bit(s) that indicate a range of the received interference power. For example, referring to FIG. 12, the second indication of the measurement of the received interference power transmitted by the UE 1204 at 1212 may include bit(s) that indicate a range of the received interference power.

In some aspects, a mapping between the bit(s) and the range may be preconfigured or predefined. For example, referring to FIG. 12, a mapping between the bit(s) and the range indicated in the second indication at 1212 may be preconfigured or predefined.

In some aspects, a mapping between the bit(s) and the range may be configured via RRC signaling. For example, referring to FIG. 12, at 1208, the network node 1202 may provide the mapping between the bit(s) and the range via RRC signaling.

In some aspects, the network node may provide, for the UE, a third indication to deactivate a reporting of the measurement, where the reception of the second indication is deactivated based on the third indication. For example, referring to FIG. 12, at 1218, the network node 1202 may provide, for the UE 1204, a third indication to deactivate a reporting of the measurement. At 1220, the UE 1204 may deactivate the reception of the second indication based on the third indication.

In some aspects, the network node may provide the third indication via DCI. For example, referring to FIG. 12, at 1218, the network node 1202 may provide the third indication via DCI.

FIG. 16 is a flowchart 1600 illustrating methods of wireless communication at a network node in accordance with various aspects of the present disclosure. In some aspects, the network node may be base station 102, the base station 310, the first base station 502, the second base station 504, the first base station 602, the second base station 604, the first base station 802, the second base station 804, the first base station 902, the second base station 904, or the base station 1002, or the network entity 1802 in the hardware implementation of FIG. 18.

At 1602, the network node may provide, for a UE, a first indication to report a measurement of cross-link interference in an SBFD slot or symbol. For example, referring to FIG. 12, at 1208, the network node 1202 may provide, for the UE 1204, a first indication to report a measurement of cross-link interference in an SBFD slot or symbol. In an aspect, 1602 may be performed by the scheduling component 199.

In some aspects, as part of 1602, at 1604, the network node may provide, for the UE, the first indication via at least one of an RRC configuration or DCI. For example, referring to FIG. 12, at 1208, the network node 1202 may provide, for the UE 1204, the first indication via at least one of an RRC configuration or DCI. In an aspect, 1604 may be performed by the scheduling component 199.

At 1606, the network node may receive a second indication of the measurement of at least one of (1) a received interference power in a first sub-band configured for uplink transmission of the SBFD slot or symbol during a PDSCH or PDCCH reception at the UE in a second sub-band configured for downlink reception of the SBFD slot or symbol or (2) an LLR quality, for a plurality of resource blocks, based on a gap corresponding to a boundary between the first sub-band configured for the uplink transmission of the SBFD slot or symbol and the second sub-band configured for the downlink reception of the SBFD slot or symbol. For example, referring to FIG. 12, at 1212, the network node 1202 may receive a second indication of the measurement of at least one of (1) a received interference power in a first sub-band configured for uplink transmission (e.g., the uplink sub-band 1102) of the SBFD slot or symbol during a PDSCH or PDCCH reception at the UE in a second sub-band configured for downlink reception (e.g., the downlink sub-band 1104) of the SBFD slot or symbol or (2) an LLR quality, for a plurality of resource blocks (e.g., RB1, . . . , RBN, as shown in FIG. 11B), based on a gap (e.g., the gap 1114) corresponding to a boundary between the first sub-band configured for the uplink transmission (e.g., the uplink sub-band 1112) of the SBFD slot or symbol and the second sub-band configured for the downlink reception (e.g., the downlink sub-band 1110) of the SBFD slot or symbol. In an aspect, 1606 may be performed by the scheduling component 199.

In some aspects, as part of 1606, at 1608, the network node may receive the second indication of the measurement via at least one of a HARQ-ACK codebook, a MAC-CE, UCI, or a payload of a PUSCH. For example, referring to FIG. 12, the network node 1202, at 1212, may receive the second indication of the measurement via at least one of a HARQ-ACK codebook, a MAC-CE, UCI, or a payload of a PUSCH. In an aspect, 1608 may be performed by the scheduling component 199.

In some aspects, the measurement of the LLR quality is based on a difference between a first average LLR of a first subset of the plurality of resource blocks and a second average LLR of a second subset of the plurality of resource blocks. For example, referring to FIG. 12, the measurement of the LLR quality received at 1212 may be based on a difference between a first average LLR of a first subset of the plurality of resource blocks and a second average LLR of a second subset of the plurality of resource blocks.

In some aspects, the second indication of the measurement of the LLR quality may include bit(s) that indicate a range in which the difference is included. For example, referring to FIG. 12, the second indication of the measurement of the LLR quality received at 1212 may include bit(s) that indicate a range in which the difference is included.

In some aspects, a mapping between the bit(s) and the range may be preconfigured or predefined. For example, referring to FIG. 12, a mapping between the bit(s) and the range indicated in the second indication at 1212 may be preconfigured or predefined.

In some aspects, a mapping between the bit(s) and the range may be configured via RRC signaling. For example, referring to FIG. 12, at 1208, the network node 1202 may provide the mapping between the bit(s) and the range via RRC signaling.

In some aspects, the first subset of the plurality of resource blocks may be located within a first frequency range, and the second subset of the plurality of resource blocks may be located with a second frequency range that is different than the first frequency range. For example, referring to FIG. 12, the first subset of the plurality of resources blocks for which the first average LLR is determined at 1210 may be located within a first frequency range, and the second subset of the plurality of resources blocks for which the second average LLR is determined at 1210 may be located within a second frequency range that is different than the first frequency range.

In some aspects, the gap may be within a third frequency range, and the first frequency range may be relatively closer to the third frequency range than the second frequency range. For example, referring to FIG. 12, the gap (e.g., the gap 1114) on which the LLR quality measurement at 1210 is based may be within a third frequency range, and the first frequency range may be relatively closer to the third frequency range than the second frequency range.

In some aspects, the second indication of the measurement of the received interference power may include bit(s) that indicate a range of the received interference power. For example, referring to FIG. 12, the second indication of the measurement of the received interference power transmitted by the UE 1204 at 1212 may include bit(s) that indicate a range of the received interference power.

In some aspects, a mapping between the bit(s) and the range may be preconfigured or predefined. For example, referring to FIG. 12, a mapping between the bit(s) and the range indicated in the second indication at 1212 may be preconfigured or predefined.

In some aspects, a mapping between the bit(s) and the range may be configured via RRC signaling. For example, referring to FIG. 12, at 1208, the network node 1202 may provide the mapping between the bit(s) and the range via RRC signaling.

At 1610, the network node may provide, for the UE, a third indication to deactivate a reporting of the measurement, where the reception of the second indication is deactivated based on the third indication. For example, referring to FIG. 12, at 1218, the network node 1202 may provide, for the UE 1204, a third indication to deactivate a reporting of the measurement. At 1220, the UE 1204 may deactivate the reception of the second indication based on the third indication. In an aspect, 1610 may be performed by the scheduling component 199.

In some aspects, as part of 1610, at 1612, the network node may provide the third indication via DCI. For example, referring to FIG. 12, at 1218, the network node 1202 may provide the third indication via DCI. In an aspect, 1612 may be performed by the scheduling component 199.

Figure 17:
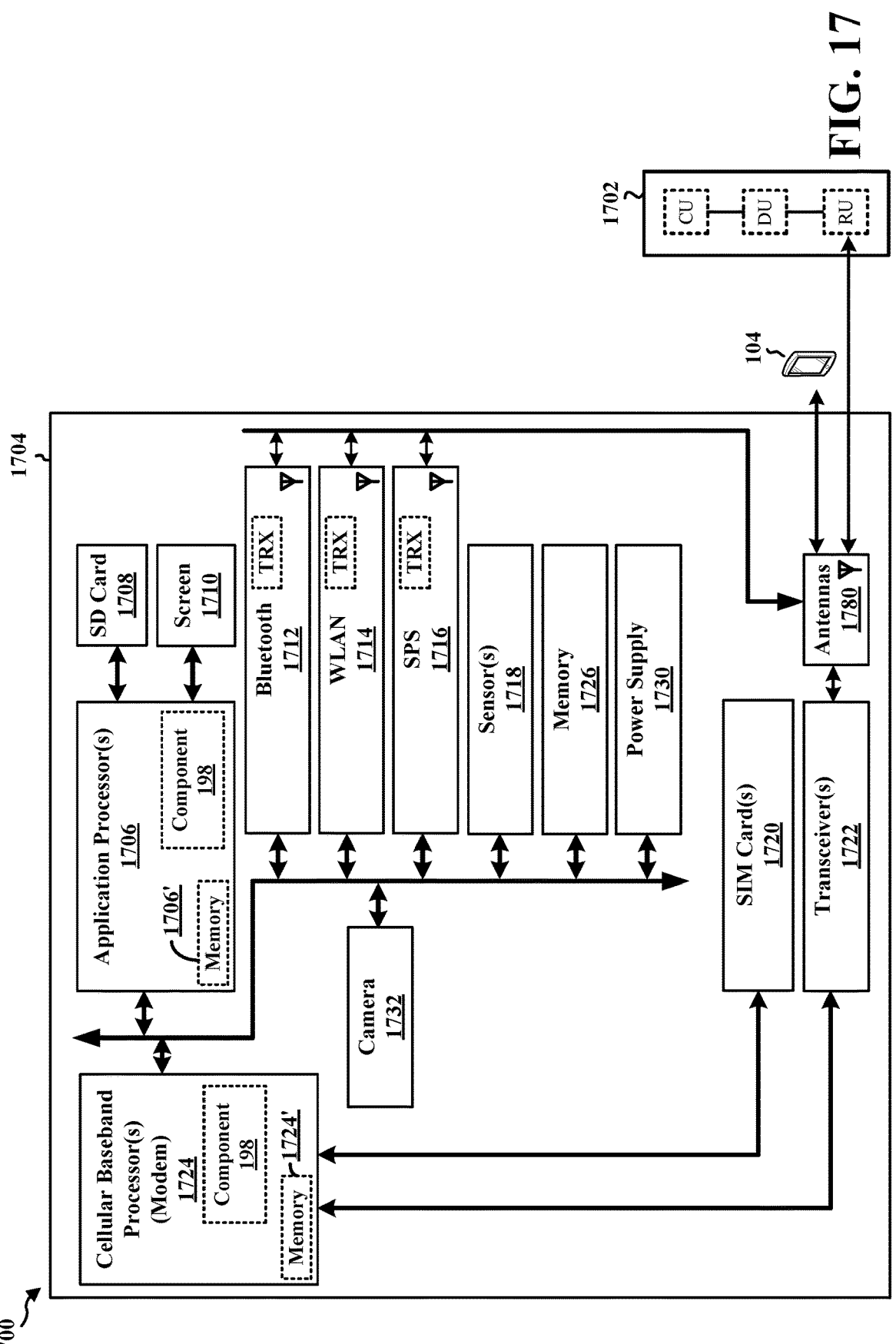
FIG. 17 is a diagram illustrating an example of a hardware implementation for an example apparatus and/or network entity.

FIG. 17 is a diagram 1700 illustrating an example of a hardware implementation for an apparatus 1704. The apparatus 1704 may be a UE, a component of a UE, or may implement UE functionality. In some aspects, the apparatus 1704 may include at least one cellular baseband processor 1724 (also referred to as a modem) coupled to one or more transceivers 1722 (e.g., cellular RF transceiver). The cellular baseband processor(s) 1724 may include at least one on-chip memory 1724'. In some aspects, the apparatus 1704 may further include one or more subscriber identity modules (SIM) cards 1720 and at least one application processor 1706 coupled to a secure digital (SD) card 1708 and a screen 1710. The application processor(s) 1706 may include on-chip memory 1706'. In some aspects, the apparatus 1704 may further include a Bluetooth module 1712, a WLAN module 1714, an SPS module 1716 (e.g., GNSS module), one or more sensor modules 1718 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1726, a power supply 1730, and/or a camera 1732. The Bluetooth module 1712, the WLAN module 1714, and the SPS module 1716 may include an on-chip transceiver (TRX) (or in some cases, just a receiver (RX)). The Bluetooth module 1712, the WLAN module 1714, and the SPS module 1716 may include their own dedicated antennas and/or utilize the antennas 1780 for communication. The cellular baseband processor(s) 1724 communicates through the transceiver(s) 1722 via one or more antennas 1780 with the UE 104 and/or with an RU associated with a network entity 1702. The cellular baseband processor(s) 1724 and the application processor(s) 1706 may each include a computer-readable medium/memory 1724', 1706', respectively. The additional memory modules 1726 may also be considered a computer-readable medium/memory. Each computer-readable medium/memory 1724', 1706', 1726 may be non-transitory. The cellular baseband processor(s) 1724 and the application processor(s) 1706 are each responsible for general processing, including the execution of software stored on the computer-readable medium/memory. The software, when executed by the cellular baseband processor(s) 1724/application processor(s) 1706, causes the cellular baseband processor(s) 1724/application processor(s) 1706 to perform the various functions described supra. The computer-readable medium/memory may also be used for storing data that is manipulated by the cellular baseband processor(s) 1724/application processor(s) 1706 when executing software. The cellular baseband processor(s) 1724/application processor(s) 1706 may be a component of the UE 350 and may include the at least one memory 360 and/or at least one of the TX processor(s) 368, the RX processor(s) 356, and the controller(s)/processor(s) 359. In one configuration, the apparatus 1704 may be at least one processor chip (modem and/or application) and include just the cellular baseband processor(s) 1724 and/or the application processor(s) 1706, and in another configuration, the apparatus 1704 may be the entire UE (e.g., see UE 350 of FIG. 3) and include the additional modules of the apparatus 1704.

As discussed supra, the component 198 may be configured to receive a first indication to report a measurement of CLI in an SBFD slot or symbol, to perform, based on the first indication to report the measurement of the CLI, a measurement of at least one of (1) a received interference power in a first sub-band configured for uplink transmission of the SBFD slot or symbol during a PDSCH or PDCCH reception in a second sub-band configured for downlink reception of the SBFD slot or symbol or (2) an LLR quality, for a plurality of resource blocks, based on a gap corresponding to a boundary between the first sub-band configured for the uplink transmission of the SBFD slot or symbol and the second sub-band configured for the downlink reception of the SBFD slot or symbol, and to transmit a second indication of the measurement of at least one of (1) the received interference power or (2) the LLR quality. The component 198 may be configured to perform any of the aspects described in connection with the flowcharts in FIGS. 13 and 14, and/or the aspects performed by the UE 1204 in the communication flow in FIG. 12. The component 198 may be within the cellular baseband processor(s) 1724, the application processor(s) 1706, or both the cellular baseband processor(s) 1724 and the application processor(s) 1706. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1704 may include a variety of components configured for various functions. In one configuration, the apparatus 1704, and in particular the cellular baseband processor(s) 1724 and/or the application processor(s) 1706, may include means for receiving a first indication to report a measurement of CLI in an SBFD slot or symbol, means for performing, based on the first indication to report the measurement of the CLI, a measurement of at least one of (1) a received interference power in a first sub-band configured for uplink transmission of the SBFD slot or symbol during a PDSCH or PDCCH reception in a second sub-band configured for downlink reception of the SBFD slot or symbol or (2) an LLR quality, for a plurality of resource blocks, based on a gap corresponding to a boundary between the first sub-band configured for the uplink transmission of the SBFD slot or symbol and the second sub-band configured for the downlink reception of the SBFD slot or symbol, and means for transmitting a second indication of the measurement of at least one of (1) the received interference power or (2) the LLR quality. The apparatus may further include means for performing any of the aspects described in connection with the flowcharts in FIGS. 13 and 14, and/or the aspects performed by the UE 1204 in the communication flow in FIG. 12. The means may be the component 198 of the apparatus 1704 configured to perform the functions recited by the means. As described supra, the apparatus 1704 may include the TX processor(s)

368, the RX processor(s) 356, and the controller(s)/processor(s) 359. As such, in one configuration, the means may be the TX processor(s) 368, the RX processor(s) 356, and/or the controller(s)/processor(s) 359 configured to perform the functions recited by the means.

Figure 18:
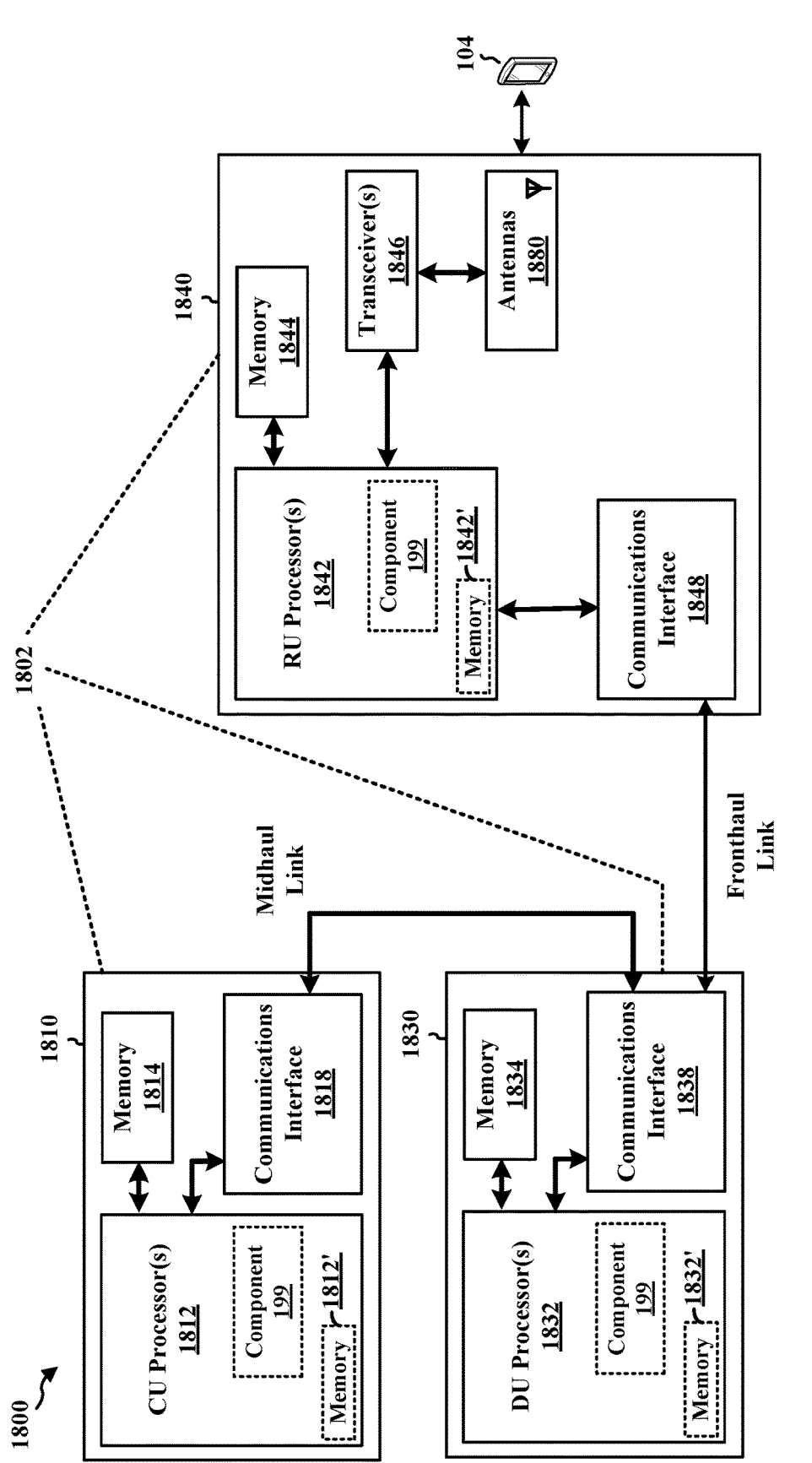
FIG. 18 is a diagram illustrating an example of a hardware implementation for an example network entity.

FIG. 18 is a diagram 1800 illustrating an example of a hardware implementation for a network entity 1802. The network entity 1802 may be a BS, a component of a BS, or may implement BS functionality. The network entity 1802 may include at least one of a CU 1810, a DU 1830, or an RU 1840. For example, depending on the layer functionality handled by the component 199, the network entity 1802 may include the CU 1810; both the CU 1810 and the DU 1830; each of the CU 1810, the DU 1830, and the RU 1840; the DU 1830; both the DU 1830 and the RU 1840; or the RU 1840. The CU 1810 may include at least one CU processor 1812. The CU processor(s) 1812 may include on-chip memory 1812'. In some aspects, the CU 1810 may further include additional memory modules 1814 and a communications interface 1818. The CU 1810 communicates with the DU 1830 through a midhaul link, such as an F1 interface. The DU 1830 may include at least one DU processor 1832. The DU processor(s) 1832 may include on-chip memory 1832'. In some aspects, the DU 1830 may further include additional memory modules 1834 and a communications interface 1838. The DU 1830 communicates with the RU 1840 through a fronthaul link. The RU 1840 may include at least one RU processor 1842. The RU processor(s) 1842 may include on-chip memory 1842'. In some aspects, the RU 1840 may further include additional memory modules 1844, one or more transceivers 1846, antennas 1880, and a communications interface 1848. The RU 1840 communicates with the UE 104. The on-chip memory 1812', 1832', 1842' and the additional memory modules 1814, 1834, 1844 may each be considered a computer-readable medium/memory. Each computer-readable medium/memory may be non-transitory. Each of the processors 1812, 1832, 1842 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 may be configured to provide, for a UE, a first indication to report a measurement of cross-link interference in an SBFD slot or symbol, and to receive a second indication of the measurement of at least one of (1) a received interference power in a first sub-band configured for uplink transmission of the SBFD slot or symbol during a PDSCH or PDCCH reception at the UE in a second sub-band configured for downlink reception of the SBFD slot or symbol or (2) an LLR quality, for a plurality of resource blocks, based on a gap corresponding to a boundary between the first sub-band configured for the uplink transmission of the SBFD slot or symbol and the second sub-band configured for the downlink reception of the SBFD slot or symbol. The component 199 may be configured to perform any of the aspects described in connection with the flowcharts in FIGS. 15 and 16, and/or the aspects performed by the network node 1202 in the communication flow in FIG. 12. The component 199 may be within one or more processors of one or more of the CU 1810, DU 1830, and the RU 1840. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1802 may include a variety of components configured for various functions. In one configuration, the network entity 1802 may include means for providing, for a UE, a first indication to report a measurement of cross-link interference in an SBFD slot or symbol, and means for receiving a second indication of the measurement of at least one of (1) a received interference power in a first sub-band configured for uplink transmission of the SBFD slot or symbol during a PDSCH or PDCCH reception at the UE in a second sub-band configured for downlink reception of the SBFD slot or symbol or (2) an LLR quality, for a plurality of resource blocks, based on a gap corresponding to a boundary between the first sub-band configured for the uplink transmission of the SBFD slot or symbol and the second sub-band configured for the downlink reception of the SBFD slot or symbol. The apparatus may further include means for performing any of the aspects described in connection with the flowcharts in FIGS. 15 and 16, and/or the aspects performed by the network node 1202 in the communication flow in FIG. 12 The means may be the component 199 of the network entity 1802 configured to perform the functions recited by the means. As described supra, the network entity 1802 may include the TX processor(s) 316, the RX processor(s) 370, and the controller(s)/processor(s) 375. As such, in one configuration, the means may be the TX processor(s) 316, the RX processor(s) 370, and/or the controller(s)/processor(s) 375 configured to perform the functions recited by the means.

Various aspects of the present disclosure, in connection with the accompanying drawings, relate generally to communication systems. Some aspects more specifically relate to determining and reporting the cross-link interference (CLI) impact on downlink performance (e.g., the decodability of a downlink transmission) in FD networks. For instance, a UE may determine the CLI impact by (1) measuring the received interference power in an uplink sub-band during the reception of a downlink communication in a downlink sub-band and/or (2) measuring the log-likelihood ratio (LLR) quality, for a plurality of resource blocks, based on a gap corresponding to a boundary between the uplink sub-band and a downlink sub-band. The UE may report the CLI impact to a network node. The network node may update its scheduler to schedule transmissions to lessen the CLI impact on the decoder of the UE.

Particular aspects of the subject matter described in this disclosure can be implemented to realize one or more of the following potential advantages. In some examples, by reporting the CLI impact to the network node, the network node may schedule uplink transmissions of different UEs in different resources without reducing the modulation coding scheme. As such, the number of useful bits that can be transmitted per resource element are not reduced, thereby improving the integrity of the data being transmitted, while also reducing the cross-link interference experienced at the UE.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X. X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a user equipment (UE), comprising receiving a first indication to report a measurement of cross-link interference in a sub-band full duplex (SBFD) slot or symbol; performing, based on the first indication to report the measurement of the cross-link interference, a measurement of at least one of (1) a received interference power in a first sub-band configured for uplink transmission of the SBFD slot or symbol during a physical downlink shared channel (PDSCH) or physical downlink control channel (PDCCH) reception in a second sub-band configured for downlink reception of the SBFD slot or symbol or (2) a log likelihood ratio (LLR) quality, for a plurality of resource blocks, based on a gap corresponding to a boundary between the first sub-band configured for the uplink transmission of the SBFD slot or symbol and the second sub-band configured for the downlink reception of the SBFD slot or symbol; and transmitting a second indication of the measurement of at least one of (1) the received interference power or (2) the LLR quality.

Aspect 2 is the method of aspect 1, wherein transmitting the second indication of the measurement comprises transmitting the second indication of the measurement via at least one of: a hybrid automatic repeat request (HARQ) acknowledgement (ACK) (HARQ-ACK) codebook; a medium access control (MAC)-control element (CE) (MAC-CE); uplink control information (UCI); or a payload of a physical uplink shared channel (PUSCH).

Aspect 3 is the method of any of aspects 1 and 2, performing the measurement of the LLR quality comprises: determining a first average LLR of a first subset of the plurality of resource blocks; determining a second average LLR of a second subset of the plurality of resource blocks; and performing the measurement based on the first average LLR and the second average LLR.

Aspect 4 is the method of aspect 3, wherein performing the measurement based on the first average LLR and the second average LLR comprises: determining a difference between the first average LLR and the second average LLR, wherein the measurement is based on the difference between the first average LLR and the second average LLR.

Aspect 5 is the method of aspect 4, wherein the second indication of the measurement of the LLR quality comprises one or more bits that indicate a range in which the difference is included.

Aspect 6 is the method of aspect 5, wherein a mapping between the one or more bits and the range is preconfigured or predefined.

Aspect 7 is the method of aspect 5, wherein a mapping between the one or more bits and the range is configured via radio resource control (RRC) signaling.

Aspect 8 is the method of aspect 3, wherein the first subset of the plurality of resource blocks is located within a first frequency range, and wherein the second subset of the plurality of resource blocks is located with a second frequency range that is different than the first frequency range.

Aspect 9 is the method of aspect 8, wherein the gap is within a third frequency range, and wherein the first frequency range is relatively closer to the third frequency range than the second frequency range.

Aspect 10 is the method of any of aspects 1 and 2, wherein the second indication of the measurement of the received interference power comprises one or more bits that indicate a range of the received interference power.

Aspect 11 is the method of aspect 10, wherein a mapping between the one or more bits and the range is preconfigured or predefined.

Aspect 12 is the method of aspect 10, wherein a mapping between the one or more bits and the range is configured via radio resource control (RRC) signaling.

Aspect 13 is the method of any of aspects 1 to 12, wherein receiving the first indication comprises receiving the first indication via at least one of: a radio resource control (RRC) configuration; or downlink control information (DCI).

Aspect 14 is the method of any of aspects 1 to 13, further comprising: receiving a third indication to deactivate a reporting of the measurement, wherein the transmission of the second indication is deactivated based on the third indication.

Aspect 15 is the method of aspect 14, wherein receiving the third indication comprises receiving the third indication via downlink control information (DCI).

Aspect 16 is a method of wireless communication at a network node, comprising: providing, for a user equipment (UE), a first indication to report a measurement of cross-link interference in a sub-band full duplex (SBFD) slot or symbol; and receiving a second indication of the measurement of at least one of (1) a received interference power in a first sub-band configured for uplink transmission of the SBFD slot or symbol during a physical downlink shared channel (PDSCH) or physical downlink control channel (PDCCH) reception at the UE in a second sub-band configured for downlink reception of the SBFD slot or symbol or (2) a log likelihood ratio (LLR) quality, for a plurality of resource blocks, based on a gap corresponding to a boundary between the first sub-band configured for the uplink transmission of the SBFD slot or symbol and the second sub-band configured for the downlink reception of the SBFD slot or symbol.

Aspect 17 is the method of aspect 16, wherein receiving the second indication of the measurement comprises receiving the second indication of the measurement via at least one of: a hybrid automatic repeat request (HARQ) acknowledgement (ACK) (HARQ-ACK) codebook; a medium access control (MAC)-control element (CE) (MAC-CE); uplink control information (UCI); or a payload of a physical uplink shared channel (PUSCH).

Aspect 18 is the method of any of aspects 16 and 17, wherein the measurement of the LLR quality is based on a difference between a first average LLR of a first subset of the plurality of resource blocks and a second average LLR of a second subset of the plurality of resource blocks Aspect 19 is the method of aspect 18, wherein the second indication of the measurement of the LLR quality comprises one or more bits that indicate a range in which the difference is included.

Aspect 20 is the method of aspect 19, wherein a mapping between the one or more bits and the range is preconfigured or predefined.

Aspect 21 is the method of aspect 19, wherein a mapping between the one or more bits and the range is configured via radio resource control (RRC) signaling.

Aspect 22 is the method of aspect 18, wherein the first subset of the plurality of resource blocks is located within a first frequency range, and wherein the second subset of the plurality of resource blocks is located with a second frequency range that is different than the first frequency range.

Aspect 23 is the method of aspect 22, wherein the gap is within a third frequency range, and wherein the first frequency range is relatively closer to the third frequency range than the second frequency range.

Aspect 24 is the method of any of aspects 16 and 17, wherein the second indication of the measurement of the received interference power comprises one or more bits that indicate a range of the received interference power.

Aspect 25 is the method of aspect 24, wherein a mapping between the one or more bits and the range is preconfigured or predefined.

Aspect 26 is the method of aspect 24, wherein a mapping between the one or more bits and the range is configured via radio resource control (RRC) signaling.

Aspect 27 is the method of any of aspects 16 to 26, wherein providing the first indication comprises transmitting the first indication via at least one of: a radio resource control (RRC) configuration; or downlink control information (DCI).

Aspect 28 is the method of any of aspects 16 to 27, further comprising: providing, for the UE, a third indication to deactivate a reporting of the measurement, wherein the reception of the second indication is deactivated based on the third indication.

Aspect 29 is the method of aspect 28, wherein providing the third indication comprises providing the third indication via downlink control information (DCI).

Aspect 30 is an apparatus for wireless communication at a UE. The apparatus includes at least one memory; and at least one processor coupled to the at least one memory and, based at least in part on information stored in the at least one memory, the at least one processor, individually or in any combination, is configured to implement any of aspects 1 to 15.

Aspect 31 is the apparatus of aspect 30, further including at least one of a transceiver or an antenna coupled to the at least one processor.

Aspect 32 is an apparatus for wireless communication at a network node. The apparatus includes at least one memory; and at least one processor coupled to the at least one memory and, based at least in part on information stored in the at least one memory, the at least one processor, individually or in any combination, is configured to implement any of aspects 16 to 29.

Aspect 33 is the apparatus of aspect 32, further including at least one of a transceiver or an antenna coupled to the at least one processor.

Aspect 34 is an apparatus for wireless communication including means for implementing any of aspects 1 to 15.

Aspect 35 is an apparatus for wireless communication including means for implementing any of aspects 16 to 29.

Aspect 36 is a computer-readable medium (e.g., a non-transitory computer-readable medium) storing computer executable code, where the code when executed by at least one processor causes the at least one processor, individually or in any combination, to implement any of aspects 1 to 15.

Aspect 37 is a computer-readable medium (e.g., a non-transitory computer-readable medium) storing computer executable code, where the code when executed by at least one processor causes the at least one processor, individually or in any combination, to implement any of aspects 16 to 29.

What is claimed is:

1. An apparatus for wireless communication at a user equipment (UE), comprising:
   at least one memory;
   a transceiver; and
   at least one processor coupled to the at least one memory and the transceiver, the at least one processor, individually or in any combination, configured to:
   receive, via the transceiver, a first indication to report a measurement of cross-link interference in a sub-band full duplex (SBFD) slot or symbol, the first indication indicating a first type or a second type of cross-link interference measurement to be performed;
   perform, responsive to the first indication indicating the first type of cross-link interference measurement, a measurement of a received interference power in a first sub-band configured for uplink transmission of the SBFD slot or symbol during a physical downlink shared channel (PDSCH) or physical downlink control channel (PDCCH) reception in a second sub-band configured for downlink reception of the SBFD slot or symbol;
   perform, responsive to the first indication indicating the second type of cross-link interference measurement, a measurement of a log likelihood ratio (LLR) quality, for a plurality of resource blocks, based on a gap corresponding to a boundary between the first sub-band configured for the uplink transmission of the SBFD slot or symbol and the second sub-band configured for the downlink reception of the SBFD slot or symbol; and
   transmit, via the transceiver, a second indication of the measurement of at least one of the received interference power or the LLR quality.

2. The apparatus of claim 1, wherein, to transmit the second indication of the measurement, the at least one processor, individually or in any combination, is configured to transmit the second indication of the measurement via at least one of:
   a hybrid automatic repeat request (HARQ) acknowledgement (ACK) (HARQ-ACK) codebook;
   a medium access control (MAC)-control element (CE) (MAC-CE);
   uplink control information (UCI); or
   a payload of a physical uplink shared channel (PUSCH).

3. The apparatus of claim 1, wherein, to perform the measurement of the LLR quality, the at least one processor, individually or in any combination, is configured to:
   determine a first average LLR of a first subset of the plurality of resource blocks;

determine a second average LLR of a second subset of the plurality of resource blocks; and perform the measurement based on the first average LLR and the second average LLR.

4. The apparatus of claim 3, wherein, to perform the measurement based on the first average LLR and the second average LLR, the at least one processor, individually or in any combination, is configured to:

determine a difference between the first average LLR and the second average LLR, wherein the measurement is based on the difference between the first average LLR and the second average LLR.

5. The apparatus of claim 4, wherein the second indication of the measurement of the LLR quality comprises one or more bits that indicate a range in which the difference is included.

6. The apparatus of claim 5, wherein a mapping between the one or more bits and the range is preconfigured or predefined.

7. The apparatus of claim 5, wherein a mapping between the one or more bits and the range is configured via radio resource control (RRC) signaling.

8. The apparatus of claim 3, wherein the first subset of the plurality of resource blocks is located within a first frequency range, and wherein the second subset of the plurality of resource blocks is located with a second frequency range that is different than the first frequency range.

9. The apparatus of claim 8, wherein the gap is within a third frequency range, and wherein the first frequency range is relatively closer to the third frequency range than the second frequency range.

10. The apparatus of claim 1, wherein the second indication of the measurement of the received interference power comprises one or more bits that indicate a range of the received interference power.

11. The apparatus of claim 10, wherein a mapping between the one or more bits and the range is preconfigured or predefined.

12. The apparatus of claim 10, wherein a mapping between the one or more bits and the range is configured via radio resource control (RRC) signaling.

13. The apparatus of claim 1, wherein, to receive the first indication, the at least one processor, individually or in any combination, is configured to receive the first indication via at least one of:

a radio resource control (RRC) configuration; or downlink control information (DCI).

14. The apparatus of claim 1, wherein the at least one processor, individually or in any combination, is configured to:

receive, via the transceiver, a third indication to deactivate a reporting of the measurement, wherein the transmission of the second indication is configured to be deactivated based on the third indication.

15. The apparatus of claim 14, wherein, to receive the third indication, the at least one processor, individually or in any combination, is configured to receive the third indication via downlink control information (DCI).

16. An apparatus for wireless communication at a network node, comprising:

at least one memory; and at least one processor coupled to the at least one memory, the at least one processor, individually or in any combination, is configured to:

provide, for a user equipment (UE), a first indication to report a measurement of cross-link interference in a sub-band full duplex (SBFD) slot or symbol, the first indication indicating a first type or a second type of cross-link interference measurement to be performed; and responsive to the first indication indicating the first type of cross-link interference measurement, receive a second indication of a measurement of a received interference power in a first sub-band configured for uplink transmission of the SBFD slot or symbol during a physical downlink shared channel (PDSCH) or physical downlink control channel (PDCCH) reception at the UE in a second sub-band configured for downlink reception of the SBFD slot or symbol;

responsive to the first indication indicating the second type of cross-link interference measurement, receive a second indication of a measurement of a log likelihood ratio (LLR) quality, for a plurality of resource blocks, based on a gap corresponding to a boundary between the first sub-band configured for the uplink transmission of the SBFD slot or symbol and the second sub-band configured for the downlink reception of the SBFD slot or symbol.

17. The apparatus of claim 16, wherein, to receive the second indication of the measurement, the at least one processor, individually or in any combination, is configured to receive the second indication of the measurement via at least one of:

a hybrid automatic repeat request (HARQ) acknowledgement (ACK) (HARQ-ACK) codebook;

a medium access control (MAC)-control element (CE) (MAC-CE);

uplink control information (UCI); or a payload of a physical uplink shared channel (PUSCH).

18. The apparatus of claim 16, wherein the measurement of the LLR quality is based on a difference between a first average LLR of a first subset of the plurality of resource blocks and a second average LLR of a second subset of the plurality of resource blocks.

19. The apparatus of claim 18, wherein the second indication of the measurement of the LLR quality comprises one or more bits that indicate a range in which the difference is included.

20. The apparatus of claim 19, wherein a mapping between the one or more bits and the range is preconfigured or predefined.

21. The apparatus of claim 19, wherein a mapping between the one or more bits and the range is configured via radio resource control (RRC) signaling.

22. The apparatus of claim 18, wherein the first subset of the plurality of resource blocks is located within a first frequency range, and wherein the second subset of the plurality of resource blocks is located with a second frequency range that is different than the first frequency range.

23. The apparatus of claim 22, wherein the gap is within a third frequency range, and wherein the first frequency range is relatively closer to the third frequency range than the second frequency range.

24. The apparatus of claim 16, wherein the second indication of the measurement of the received interference power comprises one or more bits that indicate a range of the received interference power.

25. The apparatus of claim 24, wherein a mapping between the one or more bits and the range is preconfigured or predefined.

26. The apparatus of claim 24, wherein a mapping between the one or more bits and the range is configured via radio resource control (RRC) signaling.

27. The apparatus of claim 16, wherein, to provide the first indication, the at least one processor, individually or in any combination, is configured to transmit the first indication via at least one of:

a radio resource control (RRC) configuration; or downlink control information (DCI).

28. The apparatus of claim 16, wherein the at least one processor, individually or in any combination is configured to:

provide, for the UE, a third indication to deactivate a reporting of the measurement, wherein the reception of the second indication is deactivated based on the third indication.

29. A method for wireless communication at a user equipment (UE), comprising:

receiving a first indication to report a measurement of cross-link interference in a sub-band full duplex (SBFD) slot or symbol, the first indication indicating a first type or a second type of cross-link interference measurement to be performed;

performing, responsive to the first indication indicating the first type of cross-link interference measurement, a measurement of a received interference power in a first sub-band configured for uplink transmission of the SBFD slot or symbol during a physical downlink shared channel (PDSCH) or physical downlink control channel (PDCCH) reception in a second sub-band configured for downlink reception of the SBFD slot or symbol;

performing, responsive to the first indication indicating the second type of cross-link interference measurement, a measurement of a log likelihood ratio (LLR) quality, for a plurality of resource blocks, based on a gap corresponding to a boundary between the first sub-band configured for the uplink transmission of the SBFD slot or symbol and the second sub-band configured for the downlink reception of the SBFD slot or symbol; and transmitting a second indication of the measurement of at least one of the received interference power or the LLR quality.

30. A method for wireless communication at a network node, comprising:

providing, for a user equipment (UE), a first indication to report a measurement of cross-link interference in a sub-band full duplex (SBFD) slot or symbol, the first indication indicating a first type or a second type of cross-link interference measurement to be performed; and responsive to the first indication indicating the first type of cross-link interference measurement, receiving a second indication of a measurement of a received interference power in a first sub-band configured for uplink transmission of the SBFD slot or symbol during a physical downlink shared channel (PDSCH) or physical downlink control channel (PDCCH) reception at the UE in a second sub-band configured for downlink reception of the SBFD slot or symbol;

responsive to the first indication indicating the second type of cross-link interference measurement, receiving a second indication of a measurement of a log likelihood ratio (LLR) quality, for a plurality of resource blocks, based on a gap corresponding to a boundary between the first sub-band configured for the uplink transmission of the SBFD slot or symbol and the second sub-band configured for the downlink reception of the SBFD slot or symbol.

* * * * *